(12) United States Patent
Pangborn et al.

(10) Patent No.: US 9,130,819 B2
(45) Date of Patent: Sep. 8, 2015

(54) METHOD AND APPARATUS FOR SCHEDULING RULE MATCHING IN A PROCESSOR

(71) Applicant: Cavium, Inc., San Jose, CA (US)

(72) Inventors: Jeffrey A. Pangborn, Saratoga, CA (US); Najeeb I. Ansari, San Jose, CA (US); Gregg A. Bouchard, Georgetown, TX (US); Rajan Goyal, Saratoga, CA (US)

(73) Assignee: Cavium, Inc., San Jose, CA (US)

( * ) Notice: Subject to any disclaimer, the term of this patent is extended or adjusted under 35 U.S.C. 154(b) by 226 days.

(21) Appl. No.: 13/843,992

(22) Filed: Mar. 15, 2013

(65) Prior Publication Data

US 2014/0279805 A1 Sep. 18, 2014

(51) Int. Cl.
*G06F 17/00* (2006.01)
*G06N 5/02* (2006.01)
*H04L 12/701* (2013.01)
*H04L 12/863* (2013.01)

(52) U.S. Cl.
CPC .............. *H04L 45/00* (2013.01); *H04L 47/621* (2013.01)

(58) Field of Classification Search
USPC .......................................................... 706/47
See application file for complete search history.

(56) References Cited

U.S. PATENT DOCUMENTS

| | | | |
|---|---|---|---|
| 7,558,925 B2 | 7/2009 | Bouchard et al. | |
| 8,176,300 B2 * | 5/2012 | Goyal et al. | 712/220 |
| 8,301,788 B2 * | 10/2012 | Bouchard et al. | 709/230 |
| 8,392,590 B2 * | 3/2013 | Bouchard et al. | 709/230 |
| 8,472,452 B2 * | 6/2013 | Goyal et al. | 370/400 |
| 8,560,475 B2 * | 10/2013 | Hussain et al. | 706/45 |
| 8,601,139 B2 * | 12/2013 | Goyal et al. | 709/228 |
| 8,606,959 B2 * | 12/2013 | Goyal et al. | 709/234 |
| 8,711,861 B2 * | 4/2014 | Goyal et al. | 370/392 |
| 8,719,331 B2 * | 5/2014 | Goyal et al. | 709/201 |
| 8,818,921 B2 * | 8/2014 | Hussain et al. | 706/12 |
| 8,923,306 B2 * | 12/2014 | Bouchard et al. | 370/400 |

(Continued)

OTHER PUBLICATIONS

Inference on heterogeneous e-marketplace activities, Chin-Pang Che ; Jingzhi Guo ; Zhiguo Gong Systems, Man and Cybernetics, 2009. SMC 2009. IEEE International Conference on DOI: 10.1109/ICSMC.2009.5346859 Publication Year: 2009 , pp. 3634-3639.*

(Continued)

*Primary Examiner* — Michael B Holmes
(74) *Attorney, Agent, or Firm* — Hamilton, Brook, Smith & Reynolds, P.C.

(57) ABSTRACT

In a network search processor, configured to handle search requests in a router, a scheduler for scheduling rule matching threads initiated by a plurality of initiating engines is designed to make efficient use of the resources in the network search processor while providing high speed performance. According to at least one example embodiment, the scheduler and a corresponding scheduling method comprise: determining a set of bundles of rule matching threads, each bundle being initiated by a separate initiating engine; distributing rule matching threads in each bundle into a number of subgroups of rule matching threads; assigning the subgroups of rule matching threads associated with each bundle of the set of bundles to multiple scheduling queues; and sending rule matching threads, assigned to each scheduling queue, to rule matching engines according to an order based on priorities associated with the respective bundles of rule matching threads.

20 Claims, 17 Drawing Sheets

(56) References Cited

U.S. PATENT DOCUMENTS

| | | | |
|---|---|---|---|
| 8,954,700 B2 * | 2/2015 | Ansari et al. | 711/165 |
| 8,966,152 B2 * | 2/2015 | Bouchard et al. | 711/5 |
| 8,995,449 B2 * | 3/2015 | Goyal et al. | 370/400 |
| 9,031,075 B2 * | 5/2015 | Goyal et al. | 370/392 |
| 9,065,860 B2 * | 6/2015 | Pangborn et al. | 1/1 |
| 2013/0036185 A1 | 2/2013 | Ansari et al. | |
| 2013/0036274 A1 | 2/2013 | Bouchard et al. | |
| 2013/0036284 A1 | 2/2013 | Ansari et al. | |
| 2013/0036285 A1 | 2/2013 | Ansari et al. | |
| 2013/0036288 A1 | 2/2013 | Ansari et al. | |
| 2013/0067173 A1 | 3/2013 | Pangborn et al. | |
| 2014/0279806 A1 | 9/2014 | Ansari et al. | |

OTHER PUBLICATIONS

MP-ROOM: Optimal Matching on Multiple PDUs for Fine-Grained Traffic Identification, Hao Li ; Chengchen Hu Selected Areas in Communications, IEEE Journal on vol. 32 , Issue: 10 DOI: 10.1109/JSAC.2014.2358835 Publication Year: 2014 , pp. 1881-1893.*

Inference on heterogeneous e-marketplace activities Chin-Pang Che ; Jingzhi Guo ; Zhiguo Gong Systems, Man and Cybernetics, 2009. SMC 2009. IEEE International Conference on DOI: 10.1109/ICSMC.2009.5346859 Publication Year: 2009 , pp. 3634-3639.*

Thread Relocation: A Runtime Architecture for Tolerating Hard Errors in Chip Multiprocessors, Khan, O. ; Kundu, S. Computers, IEEE Transactions on vol. 59 , Issue: 5 DOI: 10.1109/TC.2009.76 Publication Year: 2010 , pp. 651-665.*

High Performance Parallelization of Boyer-Moore Algorithm on Many-Core Accelerators Yosang Jeong; Myungho Lee; Dukyun Nam; Jik-Soo Kim; Soonwook Hwang Cloud and Autonomic Computing (ICCAC), 2014 International Conference on Year: 2014 pp. 265-272, DOI: 10.1109/ICCAC.2014.20.*

A novel graphics processor architecture based on partial stream rewriting, Middendorf, L.; Haubelt, C. Design and Architectures for Signal and Image Processing (DASIP), 2013 Conference on Year: 2013 pp. 38-45.*

Zhijun, R., et al., "The Improvement Research on Rule Matching Algorithm Rete in Electronic Commerce Application Systems," *IEEE Wireless Communications, Networking and Mobile Computing*, pp. 1-4 (2008).

Zhang, G., et al., "Research on the Promotion of Rule Engine Performance," *IEEE Intelligent Systems and Applications (ISA)*, pp. 1-3 (2010).

Kannan, A., et al., "Investigation and Management Solution for Privacy Identification and Electrical Energy Theft," *IEEE Electronics, Communication and Computing Technologies (ICECCT)*, pp. 73-77 (2011).

* cited by examiner

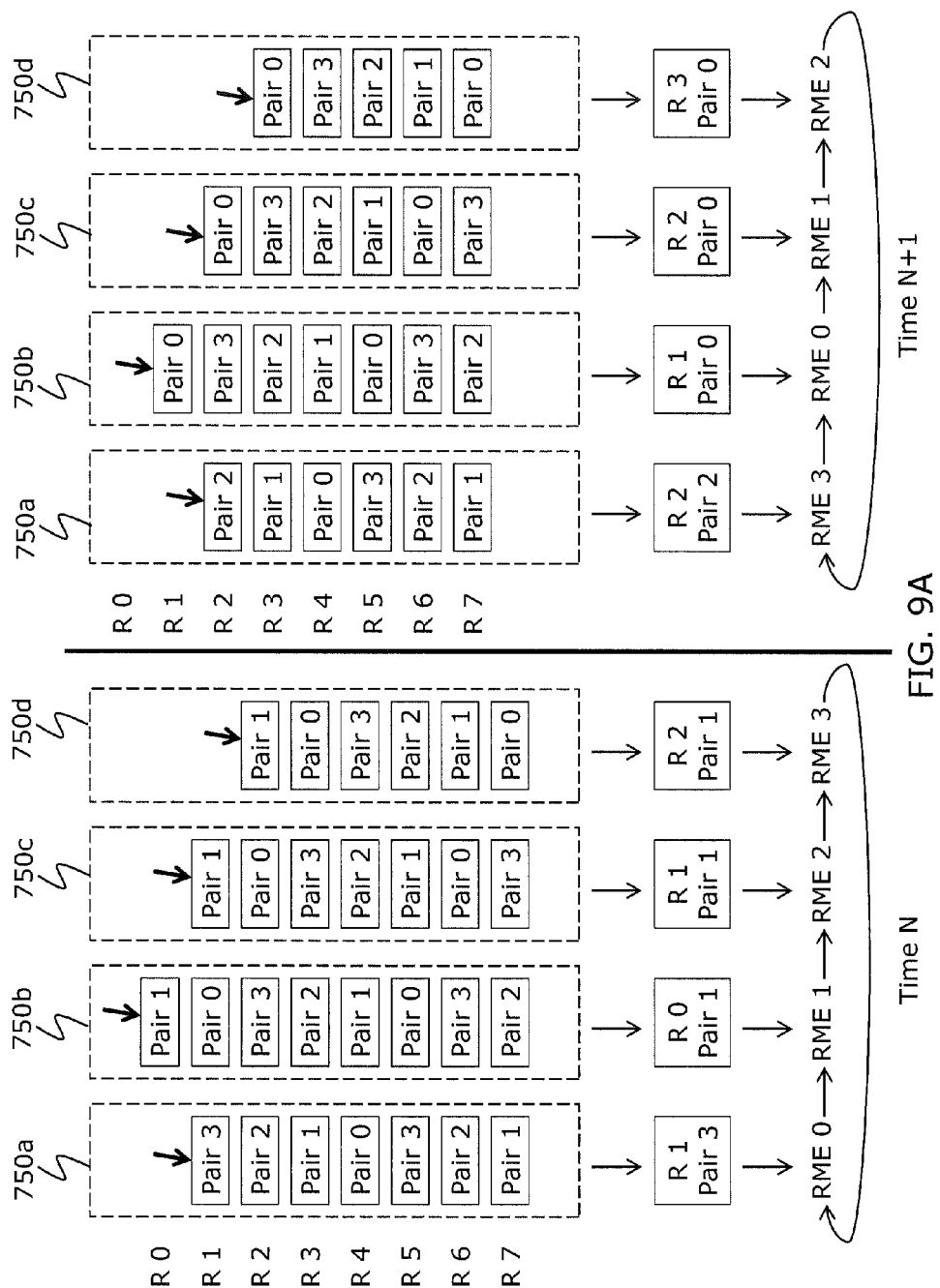

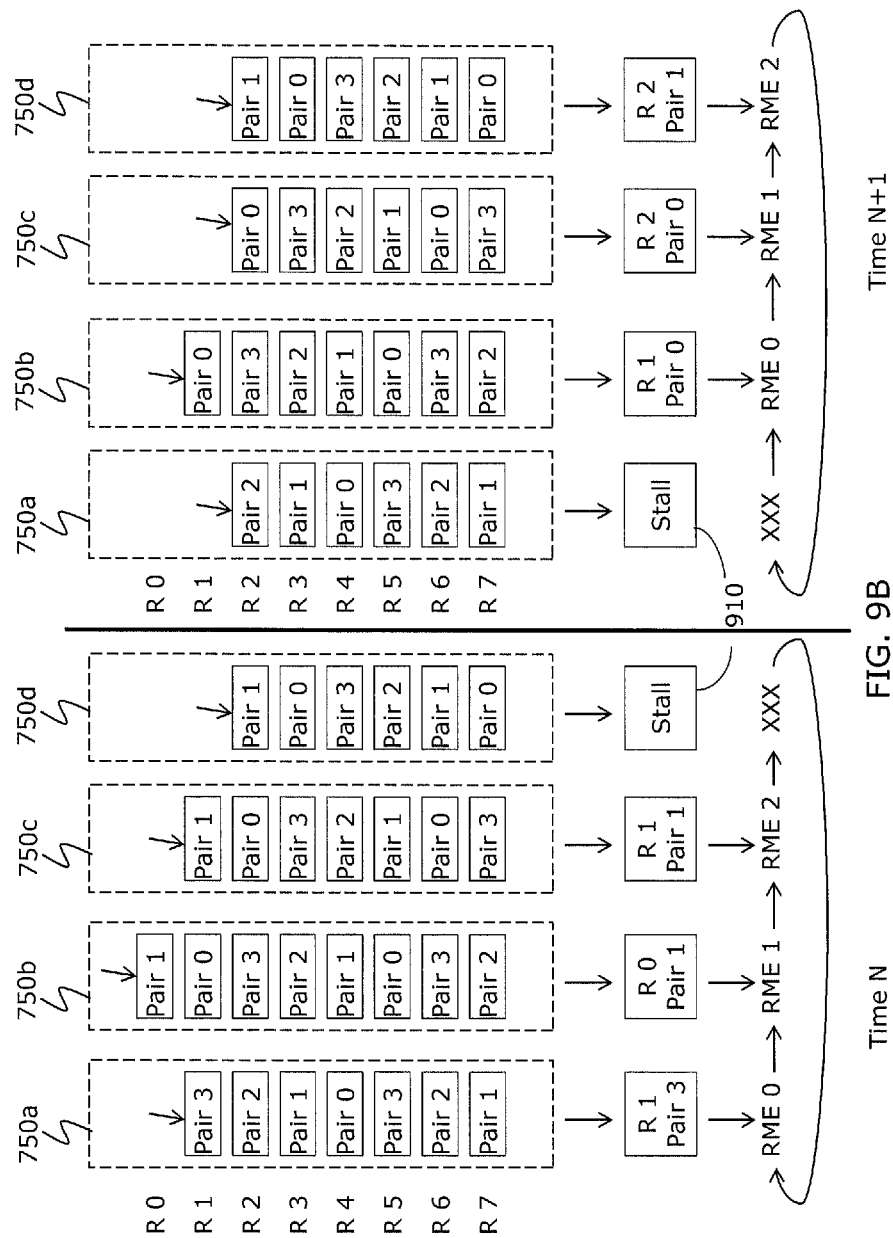

METHOD AND APPARATUS FOR SCHEDULING RULE MATCHING IN A PROCESSOR

RELATED APPLICATION(S)

The entire teachings of U.S. application entitled "Method and an Accumulator Scoreboard For Out-of-Order Rule Response Handling" filed Mar. 15, 2013 (Ser. No. 13/844,451) are incorporated herein by reference.

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, Hyper Text Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY

According to at least one example embodiment, a method and corresponding apparatus for scheduling rule matching threads initiated by a plurality of initiating engines in a network search processor comprise: determining a set of bundles of rule matching threads, each bundle being initiated by a separate processing engine; distributing rule matching threads in each bundle of the set of bundles into a number of subgroups of rule matching threads; assigning the subgroups of rule matching threads associated with each bundle of the set of bundles to multiple scheduling queues; and sending rule matching threads, assigned to each scheduling queue, to rule matching engines according to an order based on priorities associated with the respective bundles of rule matching threads.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 9A-9C are diagrams illustrating the processing of rule matching threads within scheduling queues.

DETAILED DESCRIPTION

Figure 1:
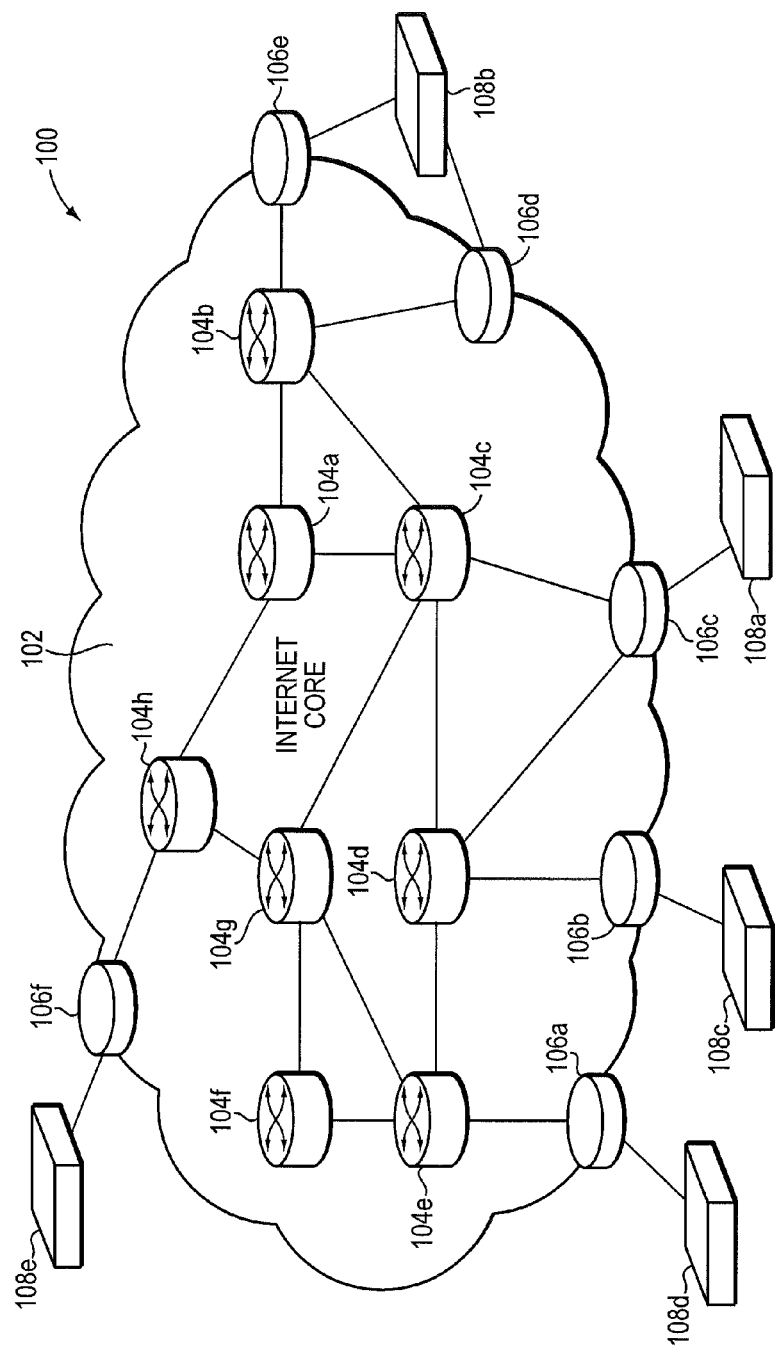
FIG. 1 is a block diagram of a typical network topology including network elements where a search processor may be employed.

A description of example embodiments of the invention follows.

Although packet classification has been widely studied for a long time, researchers are still motivated to seek novel and efficient packet classification solutions due to: i) the continued growth of network bandwidth, ii) increasing complexity of network applications, and iii) technology innovations of network systems.

Increasing demand for network bandwidth is generally due to the growth in data traffic. Leading service providers report bandwidths doubling on their backbone networks sometimes within six to nine months. As a consequence, novel packet classification solutions are required to handle the exponentially increasing traffics on both edge and core devices.

Complexity of network applications is increasing due to the increasing number of network applications being implemented in network devices. Packet classification is widely used for various kinds of applications, such as service-aware routing, intrusion prevention and traffic shaping. Therefore, handling diverse types of rule sets without significant loss of performance calls for novel intelligent solutions of packet classification.

In addition, new technologies, such as multi-core processors provide unprecedented computing power, as well as highly integrated resources. Given such advanced hardware and software technologies, users also expect high network speed and performance that matches the speed of their devices. The high network performance and speed may be achieved by employing novel intelligent packet classification solutions.

Existing packet classification algorithms trade memory for time. Although the tradeoffs have been constantly improving, the time taken for a reasonable amount of memory is still generally poor.

Because of problems with existing algorithmic schemes, designers use ternary content-addressable memory (TCAM), which uses brute-force parallel hardware to simultaneously check packets against available classification rules. The main advantages of TCAMs over algorithmic solutions are speed and determinism. TCAMs work for all databases.

A TCAM is a hardware device that functions as a fully associative memory. A TCAM cell stores three values: 0, 1, or 'X,' which represents a don't-care bit and operates as a per-cell mask enabling the TCAM to match rules containing wildcards, such as a kleene star '*'. In operation, a whole packet header may be presented to a TCAM to determine which entry, or rule, it matches. However, the complexity of TCAMs has allowed only small, inflexible, and relatively slow implementations that consume a lot of power. Therefore, efficient algorithmic solutions operating on specialized data structures present a valuable alternative.

Mathematic solutions, proposed in the art, are shown to have excellent time/spatial complexity. However, such methods are typically not implementable in real-life network devices because the mathematical solutions often add special conditions to simplify a problem and/or omit large constant factors which might conceal an explicit worst-case bound.

Proposed observation based solutions employ statistical characteristics observed in rules to achieve efficient solution for real-life applications. However, these algorithmic methods generally only work well with a specific type of packet classification rule sets. Because packet classification rules for different applications have diverse features, few observation based methods are able to fully exploit redundancy in different types of rule sets to obtain stable performance under various conditions.

Packet classification is performed using a packet classifier, also called a policy database, flow classifier, or simply a classifier. A classifier includes a collection of rules or policies. Packets received are matched with rules, which determine actions to take with a matched packet. In generic packet classification, a router classifies a packet on the basis of multiple fields in a header of the packet. Each rule of the classifier specifies a class that a packet may belong to according to criteria on 'F' fields of the packet header. An identifier, e.g., class ID, is associated with each class. For example, each rule in a flow classifier is a flow specification, in which each flow is in a separate class. The identifier uniquely specifies an action associated with each rule. Each rule has 'F' fields. An ith field of a rule R, referred to as R[i], represents an expression or condition to be evaluated with the ith field of the packet header. A packet P matches a particular rule R if, for every i, the ith field of the header of P satisfies the expression or condition R[i]. The expression or condition R[i] may be for testing whether the value of the ith field of the packet header is within a specific value range, testing whether the value of the ith field of the packet header is exactly equal to a specific value, testing whether a value corresponding to a subset of the bits of the ith field of the packet header is equal to a given value, or the like.

Classes specified by the rules may overlap. For instance, one packet may match several rules. In this case, when several rules overlap, an order in which the rules appear in the classifier determines the rules relative priority. In other words, a packet that matched multiple rules belongs to the class identified by the identifier, e.g., class ID, of the rule among them that appears first in the classifier.

Packet classifiers may analyze and categorize rules in a classifier table and create a decision tree that is used to match received packets with rules from the classifier table. A decision tree is a decision support tool that uses a tree-like graph or model of decisions and their possible consequences, including chance event outcomes, resource costs, and utility. Decision trees are commonly used in operations research, specifically in decision analysis, to help identify a strategy most likely to reach a goal. Another use of decision trees is as a descriptive means for calculating conditional probabilities. Decision trees may be used to match a received packet with a rule in a classifier table to determine how to process the received packet.

In simple terms, the problem may be defined as finding one or more rules, e.g., matching rules, that match a packet. Before describing a solution to this problem, it should be noted that a packet may be broken down into parts, such as a header, payload, and trailer. The header of the packet, or packet header, may be further broken down into fields, for example. So, the problem may be further defined as finding one or more rules that match one or more fields of the packet header.

A possible solution to the foregoing problem(s) may be described, conceptually, by describing how a request to find one or more rules matching a packet or parts of the packet, a "lookup request," leads to finding one or more matching rules.

FIG. 1 is a block diagram 100 of a typical network topology including network elements where a search processor may be employed. The network topology includes an Internet core 102 including a plurality of core routers 104a-h. Each of the plurality of core routers 104a-h is connected to at least one other of the plurality of core routers 104a-h. Core routers 104a-h that are on the edge of the Internet core 102, e.g., core routers 104b-e and 104h, are coupled with at least one edge router 106a-f. Each edge router 106a-f is coupled to at least one access router 108a-e.

The core routers 104a-104h are configured to operate in the Internet core 102 or Internet backbone. The core routers 104a-104h are configured to support multiple telecommunications interfaces of the Internet core 102 and are further configured to forward packets at a full speed of each of the multiple telecommunications protocols.

The edge routers 106a-f are placed at the edge of the Internet core 102. Edge routers 106a-f bridge access routers 108a-e outside the Internet core 102 and core routers 104a-h in the Internet core 102. Edge routers 106a-f may be configured to employ a bridging protocol to forward packets from access routers 108a-e to core routers 104a-h and vice versa.

The access routers 108a-e may be routers used by an end user, such as a home user or an office, to connect to one of the edge routers 106a-f, which in turn connect to the Internet core 102 by connecting to one of the core routers 104a-h. In this manner, the edge routers 106a-f may connect to any other edge router 106a-f via one or more of the edge routers 106a-f and one or more of the interconnected core routers 104a-104h.

The search processor described herein may reside in any of the core routers 104a-h, edge routers 106a-f, or access routers 108a-e. The search processor described herein, within each of these routers, is configured to analyze Internet protocol (IP) packets based on a set of rules and forward the IP packets along an appropriate network path.

Figure 2A:
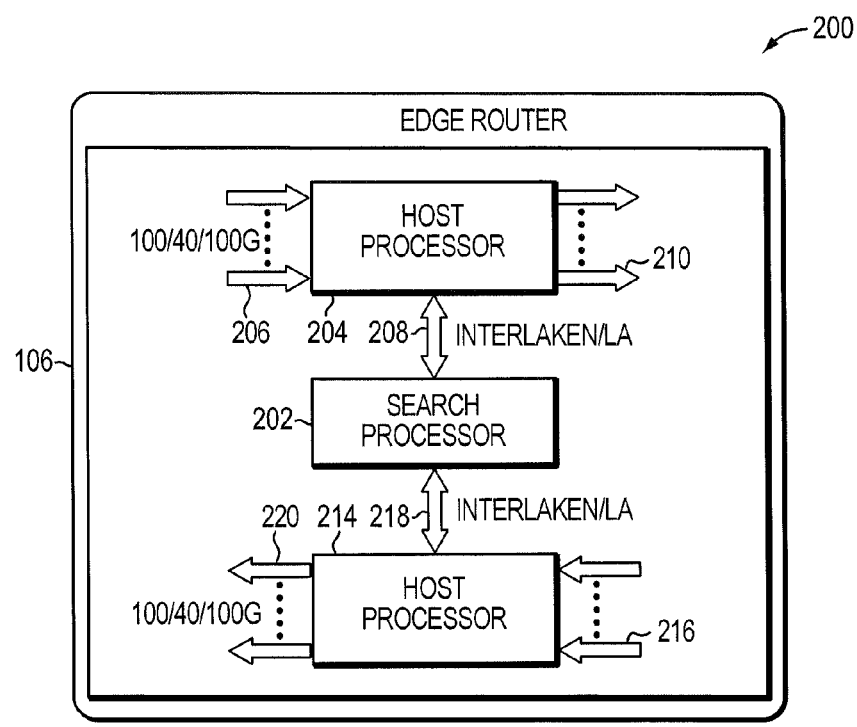
FIGS. 2A-2C show block diagrams illustrating example embodiments of routers employing a search processor.

FIG. 2A is a block diagram illustrating an example embodiment of an edge router 106 employing a search processor 202. The edge router 106, such as a service provider edge router, includes the search processor 202, a first host processor 204 and a second host processor 214. Examples of the first host processor include processors such as a network processor unit (NPU), a custom application-specific integrated circuit (ASIC), an OCTEON® processor available from Cavium Inc., or the like. The first host processor 204 is configured as an ingress host processor. The first host processor 204 receives ingress packets 206 from a network. Upon receiving a packet, the first host processor 204 forwards a lookup request including a packet header, or field, from the ingress packets 206 to the search processor 202 using an Interlaken interface 208. The search processor 202 then processes the packet header using a plurality of rule processing engines employing a plurality of rules to determine a path to forward the ingress packets 206 on the network. The search processor 202, after processing the lookup request with the packet header, forwards the path information to the first host processor 204, which forwards the processed ingress packets 210 to another network element in the network.

Likewise, the second host processor 214 is an egress host processor. Examples of the second host processor include processors such as a NPU, a custom ASIC, an OCTEON processor, or the like. The second host processor 214 receives egress packets 216 to send to the network. The second host processor 214 forwards a lookup request with a packet header, or field, from the egress packets 216 to the search processor 202 over a second Interlaken interface 218. The search processor 202 then processes the packet header using a plurality of rule processing engines employing a plurality of rules to determine a path to forward the packets on the network. The search processor 202 forwards the processed ingress packets 220 from the host processor 214 to another network element in the network.

Figure 2B:
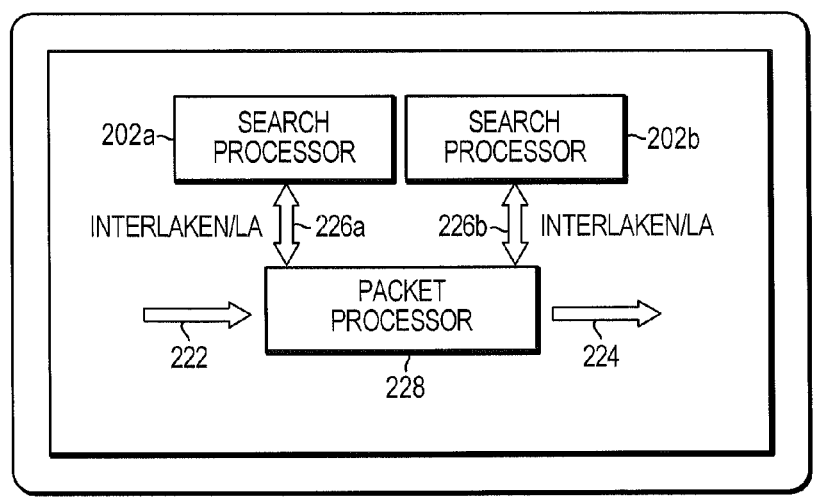

FIG. 2B is a block diagram 220 illustrating another example embodiment of an edge router 106 configured to employ the search processor 202. In this embodiment, the edge router 106 includes a plurality of search processors 202, for example, a first search processor 202a and a second search processor 202b. The search processors 202a-b are coupled to a packet processor 228 using a plurality of Interlaken interfaces 226a-b, respectively. Examples of the packet processor 228 include processors such as NPU, ASIC, or the like. The plurality of search processors 202a-b may be coupled to the packet processor 228 over a single Interlaken interface. The edge router 106 receives a lookup request with a packet header, or fields, of pre-processed packets 222 at the packet processor 228. The packet processor 228 sends the lookup request to one of the search processors 202a-b. The search processor, 202a or 202b, searches a packet header for an appropriate forwarding destination for the pre-processed packets 222 based on a set of rules and data within the packet header, and responds to the lookup request made by the packet processor 228. The packet processor 228 then sends the post processed packets 224 to the network based on the response to the lookup request from the search processors 202a or 202b.

Figure 2C:
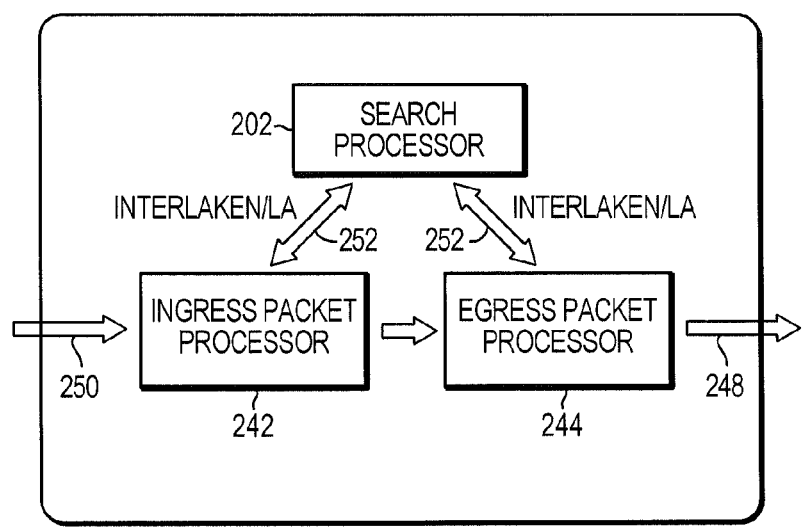

FIG. 2C is a block diagram 240 illustrating an example embodiment of an access router 246 employing the search processor 202. The access router 246 receives an input packet 250 at an ingress packet processor 242. Examples of the ingress packet processor 242 include OCTEON processor, or the like. The ingress packet processor 242 then forwards a lookup request with a packet header of the input packet 250 to the search processor 202. The search processor 202 determines, based on the packet header in the lookup request, a forwarding path for the input packet 250 and responds to the lookup request over the Interlaken interface 252 to the egress packet processor 244. The egress packet processor 244 then outputs the forwarded packet 248 to the network.

Figure 3:
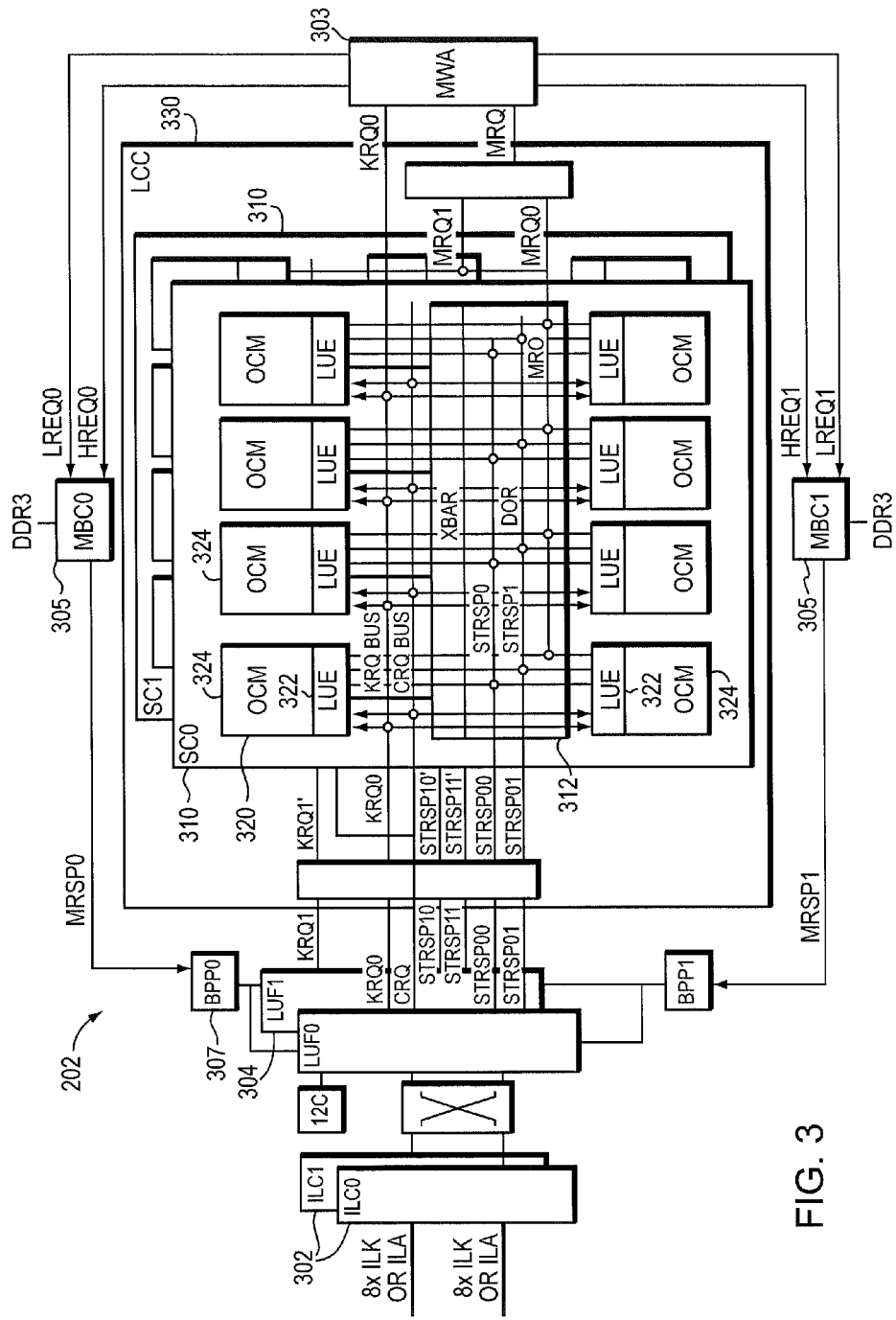
FIG. 3 shows an example architecture of a search processor.

FIG. 3 shows an example architecture of a search processor 202. The processor includes, among other things, an interface, e.g., Interlaken LA interface, 302 to receive requests from a host processor, e.g., 204, 214, 228, 242, or 244, and to send responses to the host processor. The interface 302 is coupled to Lookup Front-end (LUF) processors 304 configured to process, schedule, and order the requests and responses communicated from or to the interface 302. According to an example embodiment, each of the LUF processors is coupled to one of the super clusters 310. Each super cluster 310 includes one or more memory clusters, or search clusters, 320. Each of the memory, or search, clusters 320 includes a Lookup Engine (LUE) component 322 and a corresponding on-chip memory (OCM) component 324. A memory, or search, cluster may be viewed as a search block including a LUE component 322 and a corresponding OCM component 324. Each LUE component 322 is associated with a corresponding OCM component 324. A LUE component 322 includes processing engines configured to search for rules in a corresponding OCM component 324, given a request, that match keys for packet classification. The LUE component 322 may also include interface logic, or engine(s), configured to manage transport of data between different components within the memory cluster 320 and communications with other clusters. The memory clusters 320, in a given super cluster 310, are coupled through an interface device, e.g., crossbar (XBAR), 312. The XBAR 312 may be viewed as an intelligent fabric enabling coupling LUF processors 304 to different memory clusters 320 as well as coupling between different memory clusters 320 in the same super cluster 310. The search processor 202 may include one or more super clusters 310. A lookup cluster complex (LCC) 330 defines the group of super clusters 310 in the search processor 202.

The search processor 202 may also include a memory walker aggregator (MWA) 303 and at least one memory block controller (MBC) 305 to coordinate read and write operations from/to memory located external to the processor. The search processor 202 may further include one or more Bucket Post Processors (BPPs) 307 to search rules, which are stored in memory located external to the search processor 202, that match keys for packet classification.

Figure 4:
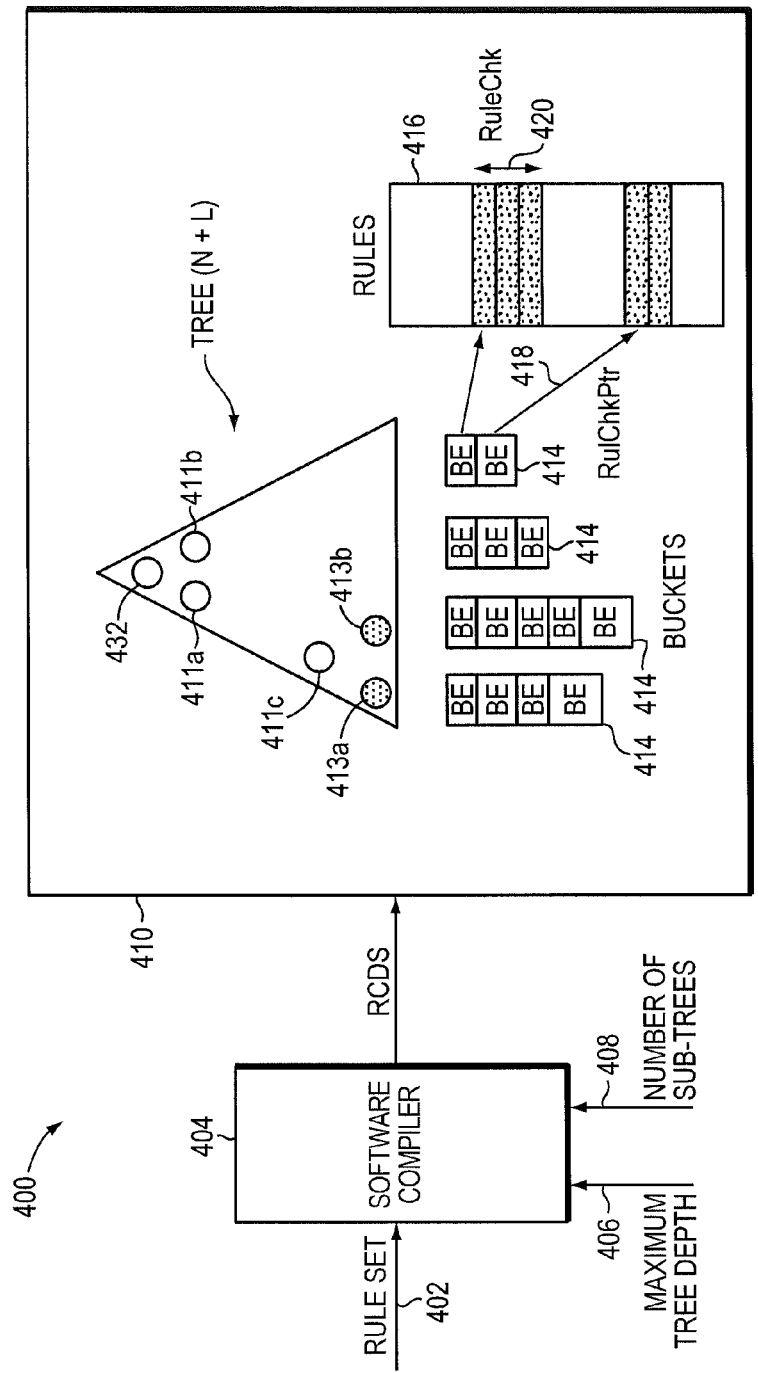
FIG. 4 is a block diagram illustrating an example embodiment of loading rules, by a software compiler, into an on-chip memory (OCM)

FIG. 4 is a block diagram 400 illustrating an example embodiment of loading rules, by a software compiler, into OCM components. According to an example embodiment, the software compiler 404 is software executed by a host processor or control plane processor to store rules into the search processor 202. Specifically, rules are loaded to at least one OCM component 324 of at least one memory cluster, or search block, 320 in the search processor 202. According to at least one example embodiment, the software compiler 404 uses multiple data structures, in storing the rules, in a way to facilitate the search of the stored rules at a later time. The software compiler 404 receives a rule set 402, parameter(s) indicative of a maximum tree depth 406 and parameter(s) indicative of a number of sub-trees 408. The software compiler 404 generates a set of compiled rules formatted, according to at least one example embodiment, as linked data structures referred to hereinafter as rule compiled data structure (RCDS) 410. The RCDS is stored in at least one OCM component 324 of at least one memory cluster, or search block, 320 in the search processor 202. The RCDS 410 includes at least one tree 412. Each tree 412 includes nodes 411a-411c, leaf nodes 413a-413b, and a root node 432. A leaf node, 413a-413b, of the tree 412 includes, or points to, one of a set of buckets 414. A bucket 414 may be viewed as a sequence or array of bucket entries, each bucket entry storing a pointer or an address, referred to hereinafter as a chunk pointer 418, of a chunk of rules 420. Buckets may be implemented, for example, using tables, linked lists, or any other data structures known in the art adequate for storing a sequence of entries. A chunk of rules 420 is basically a chunk of data describing or representing one or more rules. In other words, a set of rules 416 stored in one or more OCM components 324 of the search processor 202 includes one or more chunks of rules 420. A chunk of rules 420 may be a sequential group of rules, or a group of rules scattered throughout the memory, either organized by a plurality of pointers or by recollecting the scattered chunk of rules 420, for example, using a hash function.

The RCDS 410 described in FIG. 4 illustrates an example approach of storing rules in the search engine 202. A person skilled in the art should appreciate that other approaches of using nested data structures may be employed. For example, a table with entries including chunk pointers 418 may be used instead of the tree 412. In designing a rule compiled data structure for storing and accessing rules used to classify data packets, one of the factors to be considered is enabling efficient and fast search or access of such rules.

Once the rules are stored in the search processor 202, the rules may then be accessed to classify data packets. When a host processor receives a data packet, the host processor forwards a lookup request with a packet header, or one or more fields, from the data packet to the search processor 202. On the search processor side, a process of handling the received lookup request includes:

1) The search processor receives the lookup request from the host processor. According to at least one example embodiment, the lookup request received from the host processor includes a packet header and a group identifier (GID).
2) The GID indexes an entry in a global definition/description table (GDT). Each GDT entry includes n number of table identifiers (TID), a packet header index (PHIDX), and key format table index (KFTIDX).
3) Each TID indexes an entry in a tree location table (TLT). Each TLT entry identifies which lookup engine or processor will look for the one or more matching rules. In this way, each TID specifies both who will look for the one or more matching rules and where to look for the one or more matching rules.
4) Each TID also indexes an entry in a tree access table (TAT). TAT is used in the context in which multiple lookup engines, grouped together in a super cluster, look for the one or more matching rules. Each TAT entry provides the starting address in memory of a collection of rules, or pointers to rules, called a table of rules or tree of rules. The terms table of rules or tree of rules, or simply table or tree, are used interchangeably hereinafter. The TID identifies which collection or set of rules in which to look for one or more matching rules.
5) The PHIDX indexes an entry in a packet header table (PHT). Each entry in the PHT describes how to extract n number of keys from the packet header.
6) The KFTIDX indexes an entry in a key format table (KFT). Each entry in the KFT provides instructions for extracting one or more fields, e.g., parts of the packet header, from each of the n number of keys, which were extracted from the packet header.
7) Each of the extracted fields, together with each of the TIDs are used to look for subsets of the rules. Each subset contains rules that may possibly match each of the extracted fields.
8) Each rule of each subset is then compared against an extracted field. Rules that match are provided in responses, or lookup responses.

The handling of the lookup request and its enumerated stages, described above, are being provided for illustration purposes. A person skilled in the art should appreciate that different names as well as different formatting for the data included in a look up request may be employed. A person skilled in the art should also appreciate that at least part of the data included in the look up request is dependent on the design of the RCDS used in storing matching rules in a memory, or search, cluster 320.

Figure 5:
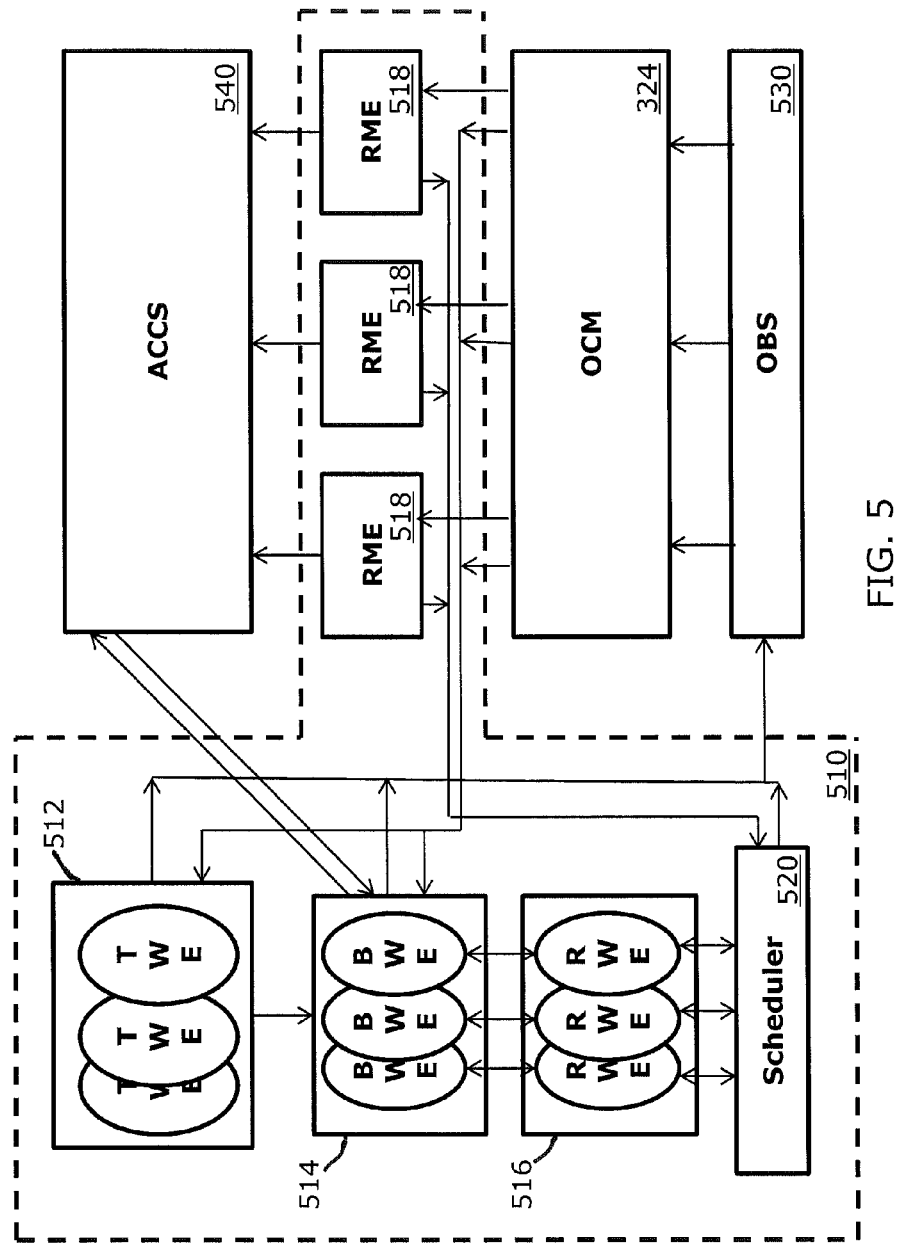
FIG. 5 shows a block diagram illustrating the architecture of a memory, or search, cluster according to at least one example embodiment.

FIG. 5 shows a block diagram illustrating the architecture of a memory, or search, cluster 320 according to at least one example embodiment. The memory, or search, cluster 320 includes an on-chip memory (OCM) component 324 configured to store and provide access to data associated with the RCDS 410. The OCM component 324 includes one or more memory banks. The distribution of the data associated with the RCDS 410 among different memory banks may be done in different ways. For example, different data structures, e.g., the tree data structure(s), the bucket data structure(s), and the chunk of rules data structure(s), may be stored in different memory banks. Alternatively, a single memory bank may store data associated with more than one data structure. For example, a given memory bank may store a portion of the tree data structure, a portion of the bucket data structure, and a portion of the chunk rule data structure.

The memory, or search, cluster 320 includes a plurality of processing engines 510 including, for example, one or more tree walk engines (TWE) 512, one or more bucket walk engines (BWE) 514, a plurality of rule walk engines (RWE) 516, and multiple rule matching engines (RME) 518. According to an example implementation, the memory, or search, cluster 320 includes eight BWEs 514, eight corresponding RWEs 516, and three RMEs 518. A person skilled in the art should appreciate that the memory, or search, cluster 320 may be designed to include different numbers of BWEs 514, RWEs 516, or RMEs 518. According to at least one example embodiment, the BWE 514 and RWE 516 may be combined into a single processing engine performing both bucket and rule chunk data searches. According to an example embodiment the RWEs 516 and the RMEs 518 may be separate processing engines. According to another example embodiment, the access and retrieval of rule chunks 420 may be performed by the RMEs 518 which also performs rule matching. In other words, the RMEs and the RWEs may be the same processors.

When the search processor 202 receives a request, called a lookup request, from the host processor, the LUF processor 304 processes the lookup request into one or more key search requests, each of which has a key 502. The LUF processor 304 then schedules the key requests to the memory or search cluster 320. The search cluster 320 receives, at a TWE 512, a key 502 from the LUF processor 304. The key 502 represents, for example, a field extracted from a packet header. The TWE 512 may further receive an indication of a specific tree 412 to be traversed, especially, if the RCDS 410 includes multiple trees. The TWE 512 is configured to walk or traverse the tree 412 stored in the OCM component 324. In response to the tree walk, a pointer to a bucket is passed from the OCM component 324 to a BWE 514 either directly or through the TWE 512. The BWE 514 is configured to walk or search buckets 414 in the OCM component 324. In response to the bucket search, bucket entries are sent from the OCM component 324 to the BWE 514, which passes the bucket entries to a respective RWE 516. Alternatively, the bucket entries may be sent directly from the OCM component 324 to the RWE 516. In another example, the RWEs 516 may be part of, or components of, the respective BWEs 514. A RME 518 is configured to determine whether the packet header field included in the key matches any rules associated with rule chunk data 420 pointed to by the pointer 418 in one of the bucket entries provided to the RWE 516.

A person skilled in the art should appreciate that the RCDS 410 may be implemented based on a different nested data structure including at least a first-type data structure and a second-type data structure. The first-type data structure may be a tree, table, linked list, or the like. Similarly, the second-type data structure may also be a tree, table, linked list, or the like. For example, one or more tables may be employed instead of the trees 412 shown in FIG. 4. Also, instead of the buckets 414 in the RCDS 410, a different data structure such as linked lists, trees, tables, or the like may be used. As such, a TWE 512 is an engine configured to search a first-type data structure in the nested data structure, for example, to search for a respective first entry based on the key. The first entry is, for example, indicative of a memory location of a second-type data structure, e.g., a bucket, in the nested data structure. The BWE 514, in a general sense, represents an engine configured to search the second-type data structure of the nested data structure.

According to at least one example embodiment, the memory, or search, cluster 320 also includes a scheduler or arbiter module 520, an OCM bank slotter (OBS) module 530, and an accumulator scoreboard (ACCS) module 540. The memory, or search, cluster 320 may further include other components or modules which are not described herein. The scheduler or arbiter module 520, also referred to as rule walk cluster arbiter RWCARB, is configured to schedule execution of rule matching threads initiated by the plurality of RWEs 514 or BWEs 516. The rule matching threads are processed by the multiple RMEs 518 to determine whether fields included in the key match any rules associated with rule chunk data 420 pointed to by the pointers 418 in the bucket entries provided to the RWEs 516 or BWEs 514. According to at least one example embodiment, in scheduling execution of rule matching threads, the scheduler or arbiter module 520 is configured to minimize processing time associated with execution of rule matching threads.

RCDS data access requests from the TWEs 512, the BWEs 514, or the RWEs 516 are sent to the OBS module 530. According to at least one example embodiment, the OBS module 530 is coupled to the memory banks in the OCM component 324 through a number of logical, or access, ports. The number of the access ports enforce constraints on the number of data access requests that may be executed, or the number of memory banks that may be accessed, at a given clock cycle. The OBS module 530 is configured to determine the data access requests to be forwarded to memory banks of the OCM component 324 at each clock cycle. The OBS module 530 attempts to maximize OCM usage while avoiding memory bank conflict and providing low latency for data access requests. Memory bank conflict occurs, for example, when attempting to access a memory bank by more than one data access request at a given clock cycle. Low latency is usually achieved by preventing access requests from waiting for a long time in the OBS module 530 before being forwarded to respective memory banks.

According to at least one example embodiment, the ACCS 540 is configured to manage results of rule matching threads generated by the RMEs 518 and determine a final result for reporting to a host processor, e.g., 204, 214, 228, 242, or 244. The ACCS 540 is also configured to report that the final result is determined to a respective BWE 514 or RWE 516.

Figure 6A:
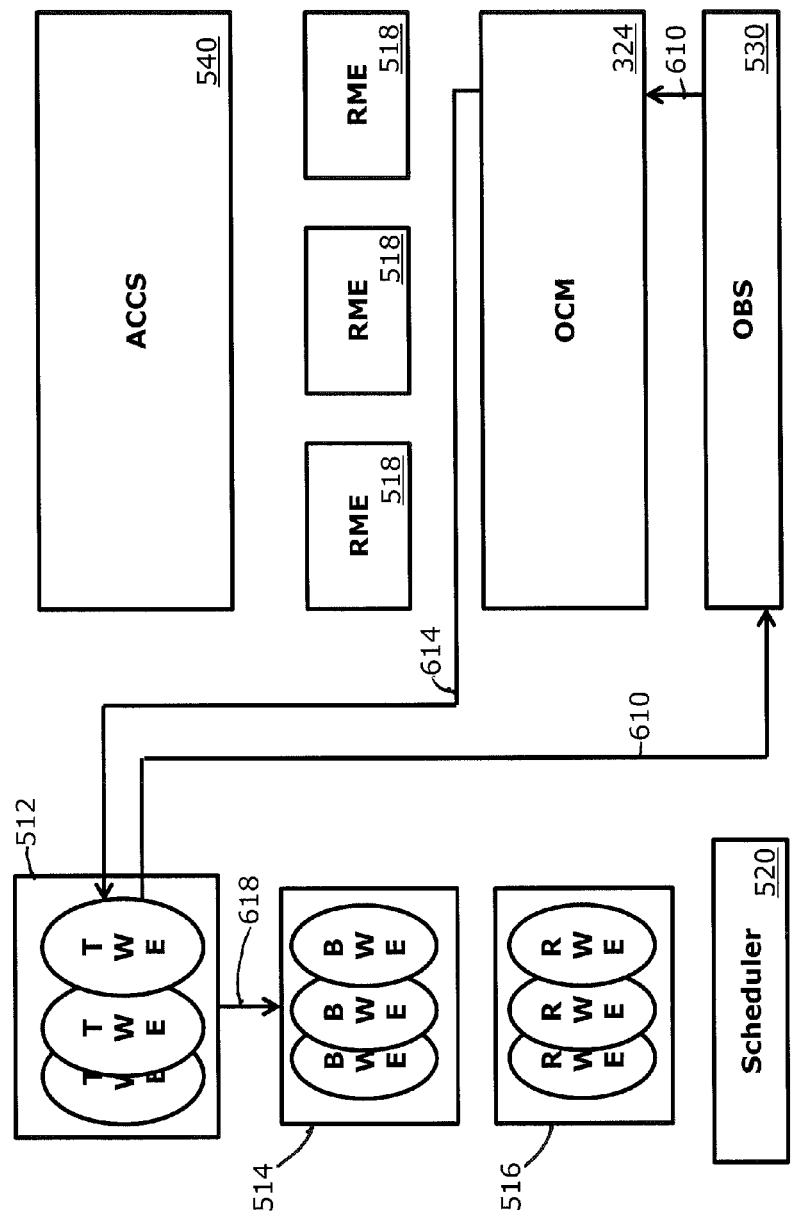
FIGS. 6A-6C are flow diagrams illustrating different stages associated with processing a key search thread.
Figure 6B:
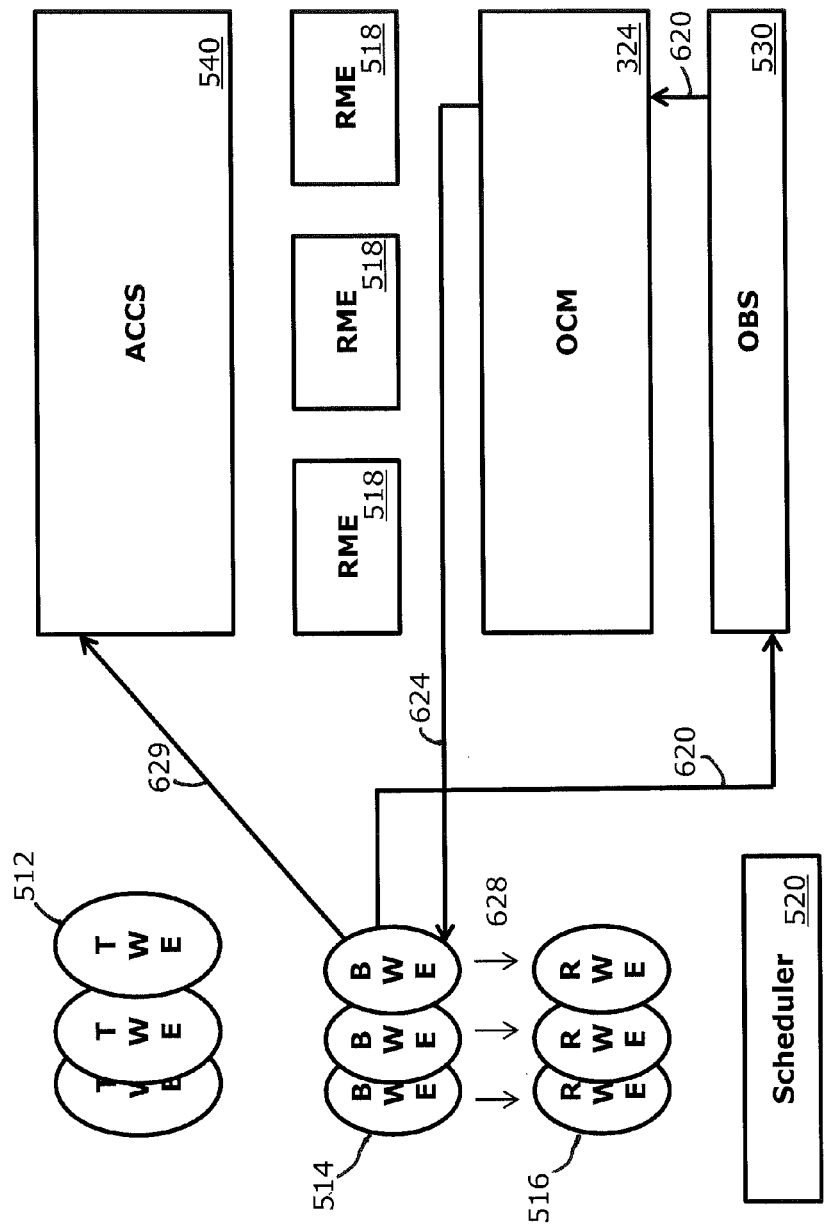
Figure 6C:
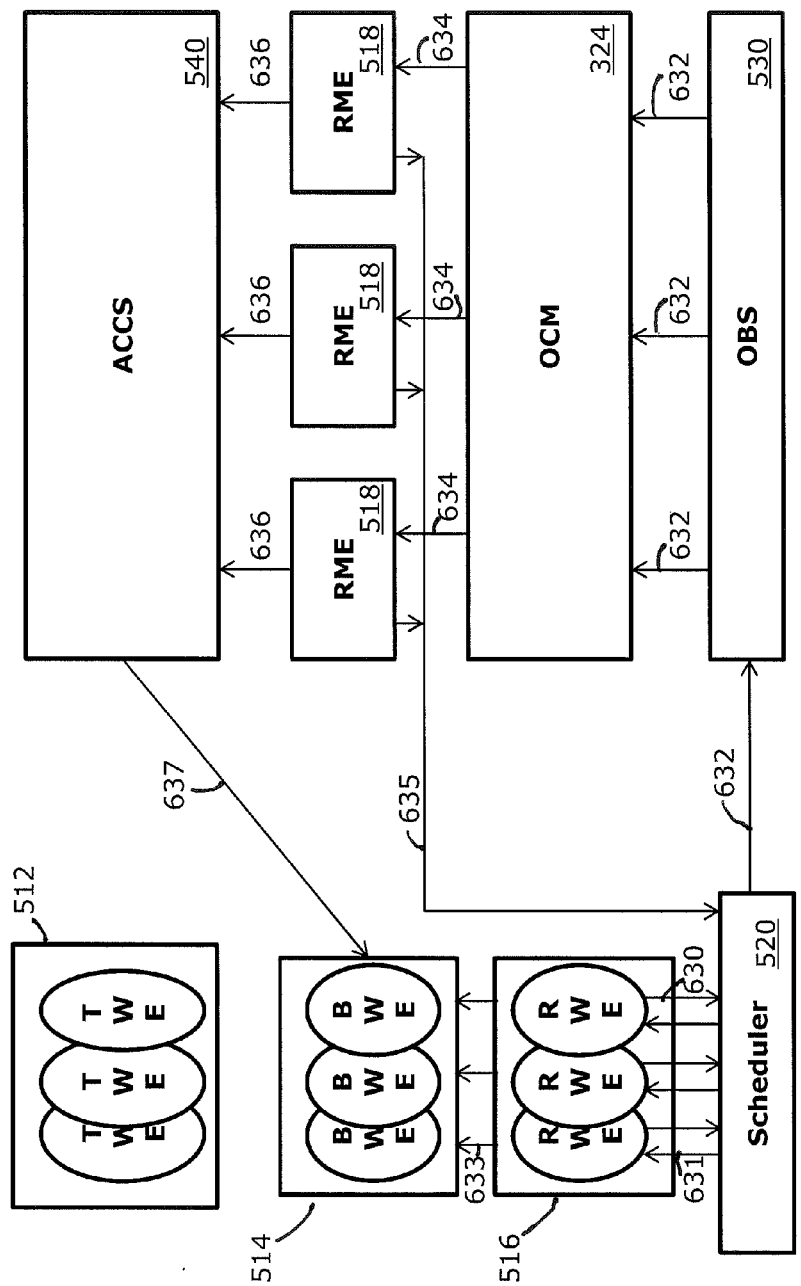

FIGS. 6A-6C are block diagrams illustrating processing flows associated with different stages of processing a key search thread within the search or memory cluster 320. The LUF processor 304 sends a key search request 502 to the memory or search cluster 320. A key search request 502 includes a key. The key represents, for example, a field extracted from a packet header. The key search request may further include an indication of a specific tree 412 to be searched, especially, if the RCDS 410 includes multiple trees.

As shown in FIG. 6A, a key search thread starts in a TWE 512 according to at least one example embodiment. The TWE receiving the key search request from the LUF processor 304 sends a tree walk request 610 to the OCM component 324 through the OBS module 530. The tree walk request is a request to read data associated with a specific tree stored in the OCM component 324. According to an example embodiment, the tree walk request includes an indication of a path to be traversed in the specific tree 412. Such indication is, for example, defined within the key. In the OCM component 324, the data associated with the indicated path is read. The path may end in a leaf node, e.g., 413a or 413b or may end before reaching a leaf node, e.g., at an interior node such as 411a, 411b, or 411c. A leaf node, 413a-413b, of the tree 412 usually includes a pointer to, or an address of, a bucket 414 and value indicative of a number of bucket entries (BEs) in the respective bucket. However, a leaf node, 413a-413b, may include no information about a bucket, e.g., no address and no number value. In the case the traversed path ends with a leaf node, e.g., 413a or 413b, which includes information related to a bucket, a leaf node response 614 is sent back to the TWE 512. The leaf node response 614 includes the pointer to, or address of, the bucket and the number value. The bucket pointer and the number value are then passed 618 from the TWE 512 to a BWE 514. Alternatively, the leaf node response 614 may be sent directly to the respective BWE 514 from the OCM component 324.

FIG. 6B is a block diagram illustrating processing flow associated with a bucket walk thread. The BWE 514 issues a bucket-data request 620 to access buckets 414 in the OCM component 324 and receive corresponding responses. The bucket-data request 620 includes, for example, the bucket pointer or address and the number value provided in the leaf node response 614. The bucket-data request 620 is sent from the BWE 514 to the OCM component 324 through the OBS 530. The bucket entries, indicated by the bucket address or pointer and the respective number of entries, are retrieved and sent in a bucket response 624 from the OCM component 324 to the BWE 514. The bucket entries are then presented 628 by the BWE 514 to an RWE 516 associated with the BWE 514. Alternatively, the bucket response 624 is sent directly from the OCM component 324 to the respective RWE 516. The RWE 516 may also be implemented as a component of the BWE 514. A bucket response 624 includes one or more bucket entries.

A bucket response 624 may contain, for example, 8 bucket entries. The 8 bucket entries include, for example, one bundle having 3 bucket entries and another having 5 entries. Alternatively, the bucket response 624 may contain a single bundle with 8 bucket entries. According to one example scenario, the bundles may be already defined at the leaf nodes. According to another example scenario, the bundles may be defined by the BWE 514. The search engine software, for example, may send configuration information defining the bundles to the BWEs or the trees. When the bundle of bucket entries is presented to the RWE 516, the BWE 514 notifies 629 the ACCS 540 of the number of bucket entries in the bundle. According to an example embodiment, a bundle of bucket entries includes one to eight entries. According to another example embodiment, a bundle of bucket entries includes one to sixteen bucket entries.

FIG. 6C is a flow chart illustrating initiation and processing flow of a rule matching thread. The RWE 516 is configured to forward 630 the bundle of bucket entries, received from the respective BWE 514, to the scheduler or arbiter module 520. Each bucket entry includes a rule chunk pointer 418 pointing to a rule chunk 420 describing a rule. The rules associated with the bundle of bucket entries are to be evaluated, based on one or more fields from the key, by the RMEs 518 to check whether the key fields satisfy any of the rules associated with the bundle of bucket entries. As such, sending a bundle of bucket entries from the RWE 516 or the BWE 514 to the scheduler or arbiter module 520 represents an initiation of a bundle of rule matching threads.

When the BWE 514 receives the bucket entries, the key, or key information, is sent to a memory or buffer accessible to the RME 518. The key or key information is, for example, indexed by a BWE 514 number or index. When a rule chunk 420 arrives at the RME 518 for processing, context information sent along with the rule chunk tells the RME 518 which BWE 514 the rule chunk 420 is for. The RME 518 uses this BWE number or index to notify the ACCS 540 of a "match" or "non-match", but also to fetch the key from the buffer for comparing against the rule chunk 420.

The scheduler or arbiter module 520 is configured to receive bundles of bucket entries from different RWEs 516, or BWEs 514, and schedule the respective rule matching threads for processing by the RMEs 518. The scheduler or arbiter module 520 assigns and passes or sends rule matching threads to the RMEs 518. According to at least one example implementation, the scheduler or arbiter module 520 is capable of sending more than one rule matching thread per clock cycle. In passing a rule matching thread to an assigned RME 518, the scheduler or arbiter module 520 is configured to send a respective rule chunk request 634 to the OCM component 324 through the OBS 530. According to at least one example embodiment, upon sending a rule chunk request 634, the scheduler or arbiter module 520 sends a notification 631 to the respective RWE 514. The RWE 516 notifies 633 the BWE 514 when all rule matching threads within the bundle have been sent by the scheduler or arbiter module 520. The notification 633 from the RWE 516 to the BWE 514 allows the BWE 514 to present more bucket entries, associated with another bucket thread or request, to the RWE 516. When the RWE 516 presents a given bundle of bucket entries to the scheduler or arbiter module 520, the same RWE 516 may not present another bundle to the scheduler or arbiter module 520 till all the respective rule chunk requests 632 corresponding to the given bundle are processed by the scheduler or arbiter module 520 and sent to the module OBS 530. A rule chunk request 632 sent from the scheduler 520 to the OBS 530 includes, for example, a starting address of the data to be read and an indication of the amount of data to be read, e.g., a number of consecutive addresses. The starting address and indication of the amount of data are obtained from the respective bucket entry, and are passed to the scheduler 520 by the RWE 516.

The rule chunk request 632 includes the rule chunk pointer 418, from the respective bucket entry, referencing a respective rule chunk 420. The rule chunk request 632 is forwarded by the OBS 530 to the OCM component 324. The OBS 530 may forward the rule chunk request 632 as multiple sub-requests each for reading a single memory line, for example, At the OCM component 324, the rule chunk 420 indicated by the rule chunk pointer 418, associated with the rule matching thread, is retrieved and then forwarded 634 to a respective RME 518 to which it was assigned by the scheduler or arbiter module 520. The assigned RME 518 checks whether the rule represented by the received rule chunk 420 is satisfied by field(s) in the key. The assigned RME 518 processes the rule chunk 420 and reports a "match" or "no-match" result to the ACCS 540. The assigned RME 518 may also report an "error" to the ACCS 540 in case an error occurs during the processing of the rule matching thread. Upon processing the rule chunk 420 and reporting 636 a result to the ACCS 540, the assigned RME may also send a notification 635 to the scheduler or arbiter module 520 indicating that the rule matching thread is processed.

A rule chunk 420, associated with a respective rule chunk request 632, is entirely presented to the RME 518 and may not be distributed among more than one RME 518. According to at least one scenario, interleaving of data chunks presented to a particular RME 518 is not allowed. The amount of data associated with data chunks 420 may vary from one data chunk to another. The processing time of a rule matching thread by the RME 518 also varies based on the size of the respective rule chunk 420. For example, data chunks 420 with more data lines take longer time to be processed by the respective RMEs 518. According to at least one scenario, the RMEs 518 in the memory, or search, cluster 320 are of equivalent functionality and equally-capable of processing rule matching threads. In other words, the RMEs 518 have equal processing capabilities.

The ACCS is configured to gather the responses 636 for all the rule matching threads within the respective bundle and determine a final result for the bundle. Upon determining a final result, the ACCS 540 is configured to send a notification 637 to the respective BWE 514 indicating that the bundle has been fully processed and including the final result, e.g., "error," "match," or "non-match." Upon receiving a response 637, the BWE 514 decides how to proceed. If the response is indicative of a "non-match", the BWE 514 initiates another bucket request 620 to fetch bucket entries from the OCM component 324. If the response is indicative of an "error, the BWE 514 will stop reading additional bucket entries and return "no-match" to the LUF. This process continues until a "match" is found by an RME 518, an "error" is indicated by an RME 518, or the BWE 514 has exhausted the number of bucket entries indicated in the leaf node, e.g., 413a and 413b. That is, if at some point the BWE 514 receives a response indicative of a "match", it stops initiating new rule chunk searches and waits for any outstanding rule matching threads to complete processing. If the response is indicative of a "non-match," the BWE 514 continues reading bucket entries and initiating more rule searches.

If at some point the BWE 514 receives a response indicative of a "match," it stops initiating new rule searches and waits for any outstanding rule searches to complete processing. Then, the BWE 514 provides, or causes the ACCS 540 to provide, a response to the host processor through the LUF processor 304, indicating that there is a "match" between the key field(s) and one or more rules in the retrieved rule chunk(s). If the BWE 514 exhausts all bucket entries in the bucket without receiving any "match" response, the BWE 514 reports, or causes reporting of, a response to the host processor through the LUF processor 304 indicating that there is no match.

The notification 635 allows the scheduler or arbiter module 520 to keep track of the availability status of the RMEs 518. According to at least one example embodiment, the scheduler 520 maintains indications of the statuses of the buffers associated with the RMEs 518. Such indications may be described in terms of memory units referred to hereinafter as credits. Given a number of credits C indicative of the memory capacity of a given RME 518, the scheduler 520 is configured to decrements C by a number of credits n, representing the size of a rule chunk 420, when a respective rule matching thread is sent toward the given RME 518. At this stage the memory capacity of the given RME is C-n. When the given RME 518 is done processing the rule matching thread, it signals the number of credits n back to the scheduler 520 in the notification 635 and the scheduler 520 increments the credits by n.

Figure 7A:
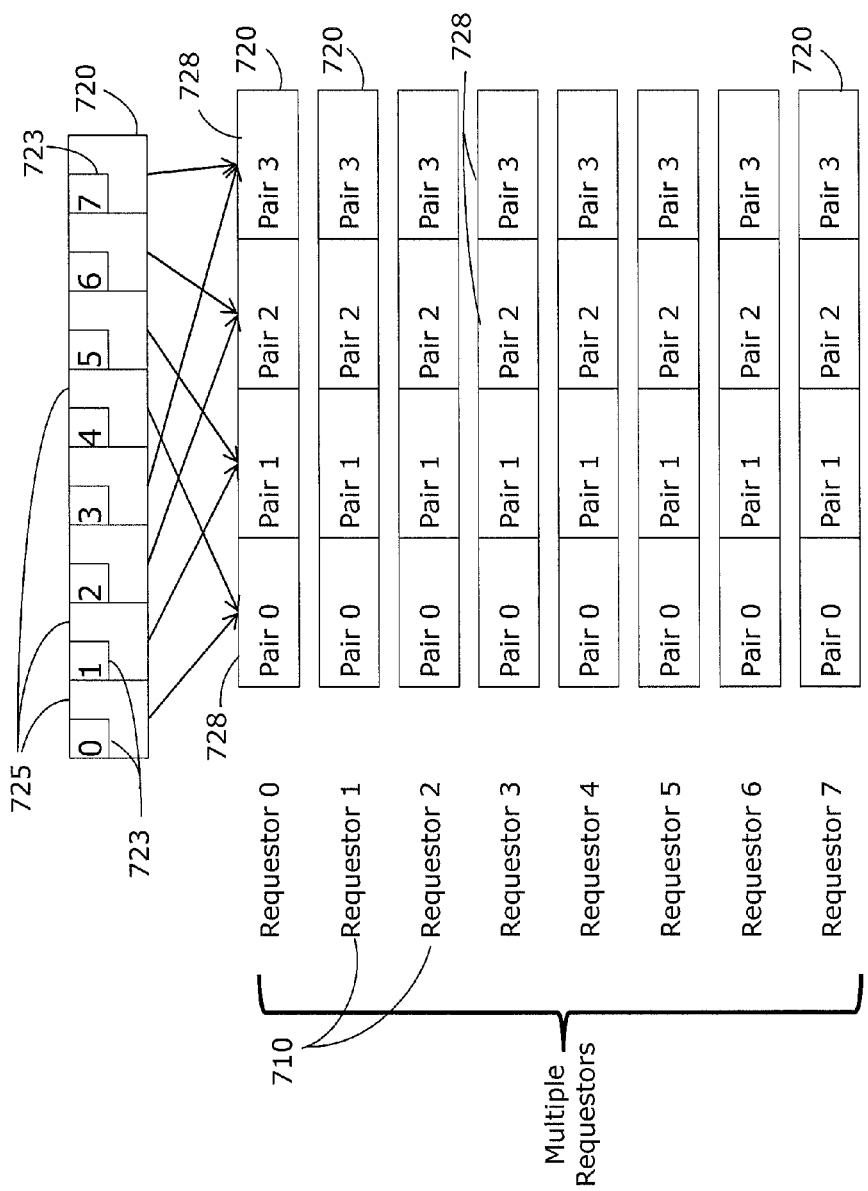
FIGS. 7A and 7B are block diagrams illustrating scheduling of bundles of rule matching threads within the scheduler or arbiter module, according to at least one example embodiment.
Figure 7B:
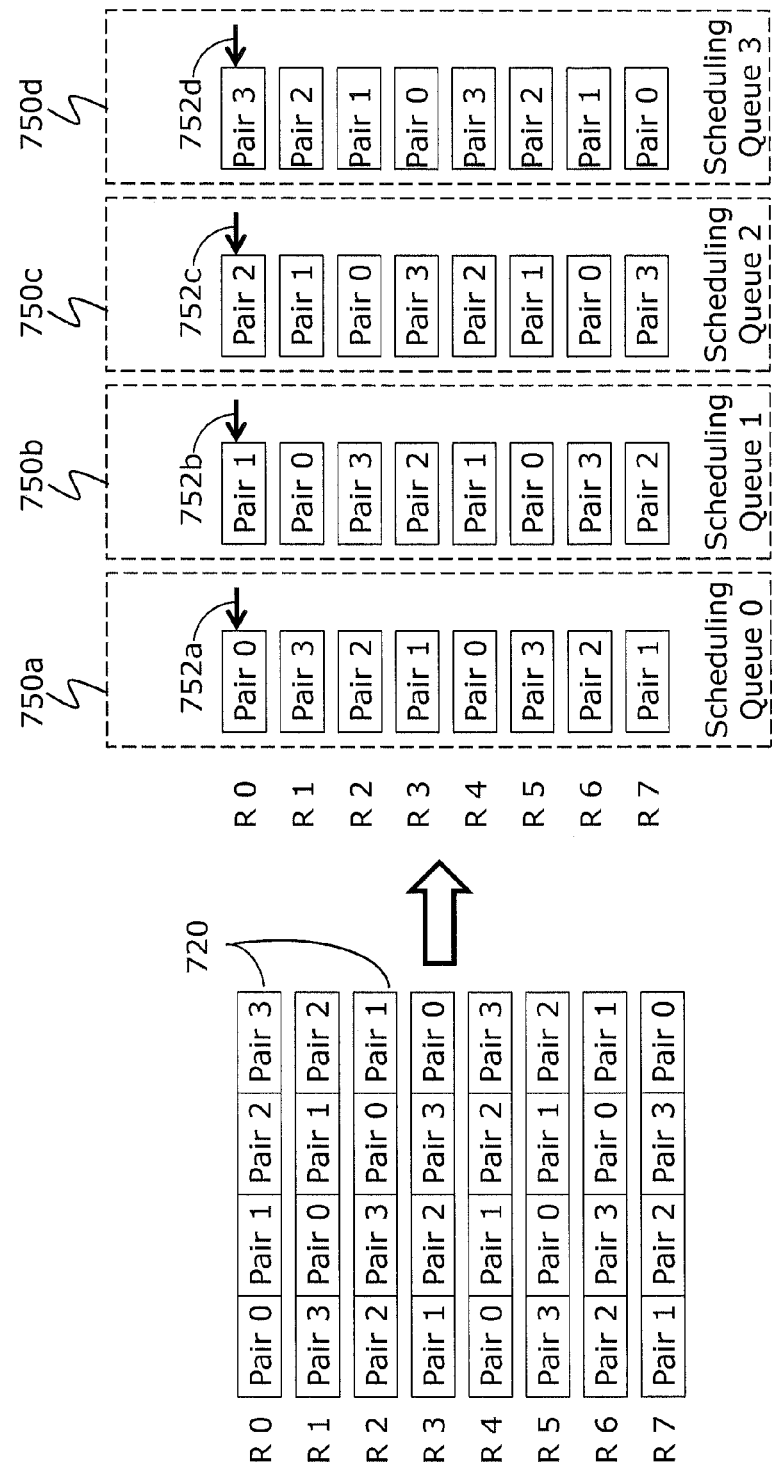

FIGS. 7A and 7B are block diagrams illustrating scheduling of bundles of rule matching threads 725 in the scheduler or arbiter module 520, according to at least one example embodiment. As shown in FIG. 7A, rule matching threads 725, in each bundle 720 of rule matching threads, are assigned priority values 723. The priority value 723 of a given rule matching thread 725 is indicative of the relative priority of given rule matching thread 725 compared to other threads in the same bundle. In determining a final result for the bundle 720, at the ACCS 540, the priority values 723 of respective rule matching threads 725 are taken into consideration. For example, the final result may be determined as the matching result of a given rule matching thread with highest priority among the rule matching threads in the bundle with matching results equal to "match" or "error." In the implementation shown in FIG. 7A, the lower the priority value 723, the higher is the priority of the respective rule matching thread 725. For example, the rule matching thread with priority value 0 has the highest priority in the bundle 720. A person skilled in the art should appreciate that other implementations may be employed where, for example, a higher priority value is indicative of a higher priority.

As shown in FIG. 7A, the rule matching threads 725 in each respective bundle 720 are distributed into a number of subgroups 728 of rule matching threads. For example, each subgroup 728 includes two rule matching threads 725 as shown in FIG. 7A. Alternatively, each subgroup 728 may include four rule matching threads 725. According to at least one example scenario, the rule matching threads 725 in a each bundle 720 are distributed among respective subgroups 728 in a way that each subgroup 728 includes rule matching threads 725, from the same bundle 720, with high and relatively low priorities. For example, the "Pair 0" includes the rule matching threads with priority values 0 and 4, whereas the "Pair 1" includes the rule matching threads with priority values 1 and 5, and so on. A person skilled in the art should appreciate that a different distribution scheme may be used. According to at least one example embodiment, the scheduler or arbiter module 520 can not have, at any time instant, more than one bundle 720 being processed or in a queue to be processed from a given requestor, or rule matching thread initiator, 710. The requestor 710 of a given rule matching thread is the processing engine that initiated the rule matching thread 725 or sent it to the scheduler. For example, the requestor 710 for given rule matching thread may be the respective BWE 514 or the respective RWE 516. A bundle priority value is assigned to each bundle 720. The bundle priority value for a given bundle 720 may be assigned, for example, based on the respective requestor 710. A person skilled in the art should appreciate that the priority values 723 may be assigned based on other criteria such as the number of requests 725 in each bundle, the presence/absence of specific priority value(s) 723 in a bundle, or the like. FIG. 7B is a block diagram illustrating scheduling of subgroups 728 of rule matching threads in the scheduler or arbiter module 520 according to at least one example embodiment. For each bundle 720, corresponding to a respective requestor 710, the respective subgroups 728 are assigned to multiple scheduling queues 750a-d of the scheduler or arbiter module 520. According to at least one implementation scenario, the number of subgroups 728 for each bundle 720 is equal to the number of scheduling queues in the scheduler or arbiter module 520. In such a case, each subgroup 728 in a given bundle 720 is assigned to a separate scheduling queue, e.g., 750a, 750b, 750c, or 750d. Alternatively, the number of scheduling queues 750 may be smaller than or greater than the number of subgroups 728 in each bundle 720. In such a case, either more than one subgroup 728 or no subgroup 728 of a given bundle 720 may be assigned to a particular scheduling queue 750.

According to at least one example embodiment, the assignment of subgroups 728 is performed in such a way that subgroups 728 of a bundle having a higher bundle priority are assigned to the scheduling queues, e.g., 750a-d, prior to subgroups 728 of bundle having relatively lower bundle priority. For example, the eight requestors R0, . . . , R7, the bundle priorities may be defined such as the bundle corresponding to R0 has the highest bundle priority, the bundle corresponding to R1 has the second highest bundle priority, . . . , and the bundle corresponding to R7 has the lowest bundle priority. In such case, the bundle corresponding to the requestor R0 is always assigned first, followed by the bundle corresponding to the requestor R1, and so forth. Also, for a given scheduling queue, the subgroups assigned from different bundles 720 may have different indices. For example, for the bundle corresponding to the requestor R0, the subgroups "Pair 0," "Pair 1," "Pair 2," and "Pair 3" are assigned, respectively, to the scheduling queues 750a, 750b, 750c, and 750d. For the bundle corresponding to the requestor R1, however, the subgroups "Pair 3," "Pair 0," "Pair 1," and "Pair 2" are assigned, respectively, to the scheduling queues 750a, 750b, 750c, and 750d.

By changing how subgroups are assigned to the scheduling queues from one bundle to another, the rule matching threads with relatively high priority, in different bundles, are distributed among the different scheduling queues, e.g., 750a-d. Once subgroups 728 are assigned to the scheduling queues, e.g., 750a-d, the subgroups are then scheduled to be forwarded toward the RMEs 518 based on the respective bundle priorities. The scheduler pointers, e.g., 752a-d, indicate the subgroups to be forwarded, in a current or next clock cycle, in each scheduling queue, e.g., 750a-d. Also, within each subgroup, a rule matching thread with higher priority is scheduled to be forwarded prior to another rule matching thread with relatively lower priority.

According to at least one example scenario, subgroups 728 of rule matching threads 725 are constructed in a way that priority values 723 are almost evenly distributed among the subgroups 728. Also the assignment of subgroups 728 to the multiple scheduling queues, e.g., 750a-d, is rotated at each bundle 720. As such, the scheduler 520 is designed in way to enforce parallel processing of rule matching threads 725 with high priority as much as possible. For example, in FIG. 7B, the pointers 752a-d and the respective subgroups pointed to indicate that the rule matching thread with priority value 0 is being forwarded in the scheduling queue 750a, the rule matching thread with priority value 1 is being forwarded in the scheduling queue 750b, the rule matching thread with priority value 2 is being forwarded in the scheduling queue 750c, and the rule matching thread with priority value 3 is being forwarded in the scheduling queue 750d.

Figure 8:
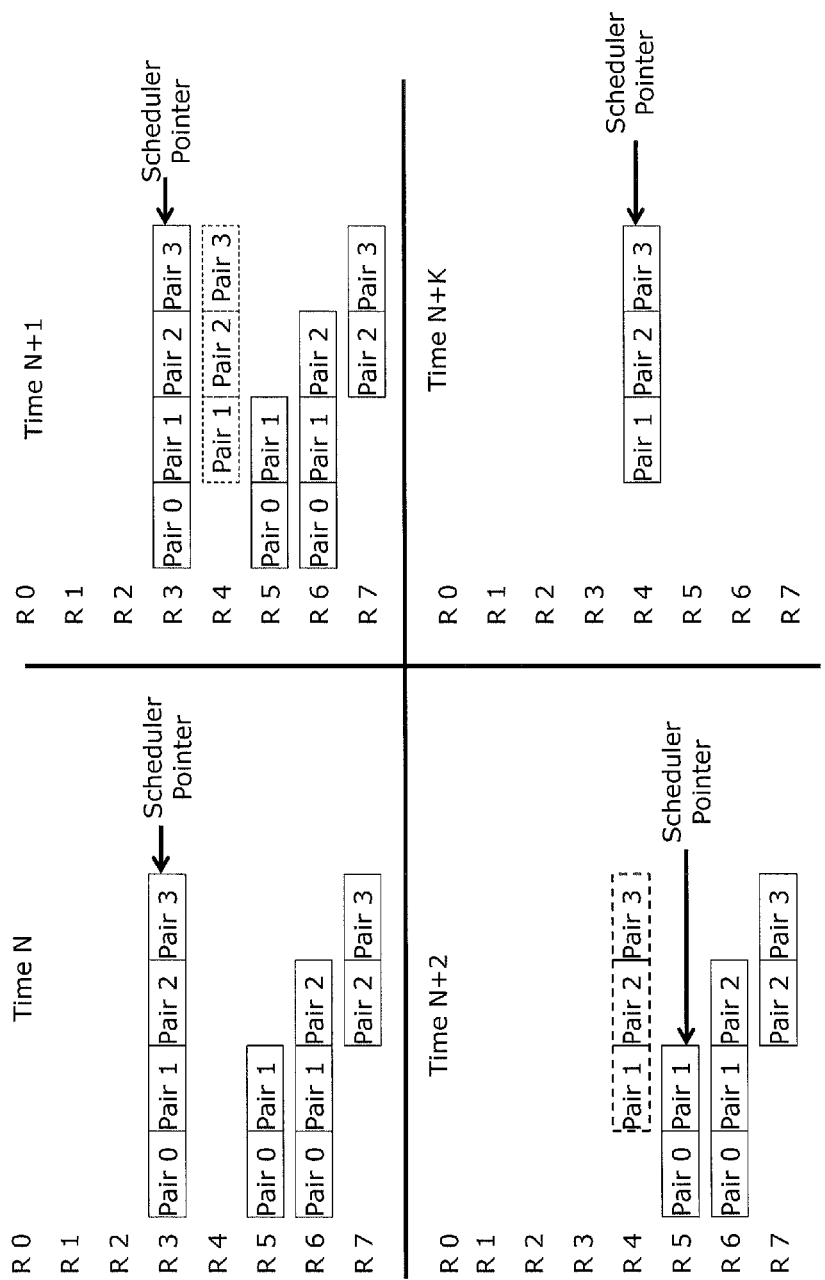
FIG. 8 is a diagram illustrating determination and processing of a set of bundles within the scheduler or arbiter module, according to at least one example embodiment.

FIG. 8 is a diagram illustrating determination and processing of a set of bundles within the scheduler or arbiter module 520, according to at least one example embodiment. The scheduling of rule matching threads 725, in the scheduler or arbiter module 520, is performed in sets of bundles 720. A set of bundles of rule matching threads is determined and processed. Once the processing of the set of bundles is complete, a new set is determined and processed. At a clock cycle N, for example, the scheduler or arbiter module 520 is ready to process bundles 720 of rule matching threads received from the RWEs 516 or the BWEs 514. The scheduler 520 determines, at the same clock cycle N, a set of bundles 720 of rule matching threads to be scheduled and forwarded toward the RMEs 518. The set of bundles may be defined to include all the bundles 720 available at the scheduler 520 at the clock cycle N. Alternatively, the determined set may be a subset of all the bundles 720 available at the scheduler 520 at the clock cycle N. In FIG. 8, the determined set includes the bundles corresponding to the requestors R3, R5, R6, and R7.

At the clock cycle N+1, the scheduler 520 is assigning and forwarding rule matching threads 725 in the bundle with highest bundle priority, e.g., the bundle corresponding to R3, to the RMEs 518. At the same clock cycle N+1, another bundle of rule matching threads corresponding to the requestor R4 is received at the scheduler. At the clock cycle N+2, the bundle corresponding to R3 is completely processed and the respective rule matching threads 725 are forwarded toward the RMEs 518, so the scheduler pointer 752 points to the next bundle in the determined set, e.g., the bundle corresponding to the requestor R5. The bundle corresponding to the requestor R4, shown in dashed lines, is skipped even though it has higher bundle priority than the bundle corresponding to R5 because it is not in the determined set. At the clock cycle N+K, the scheduler 520 is done with forwarding all the bundles in the determined set. The scheduler 520 determined a new set, which includes only the bundle corresponding to R4. The scheduler pointer 752 points to the bundle corresponding to R4.

Figure 9C:
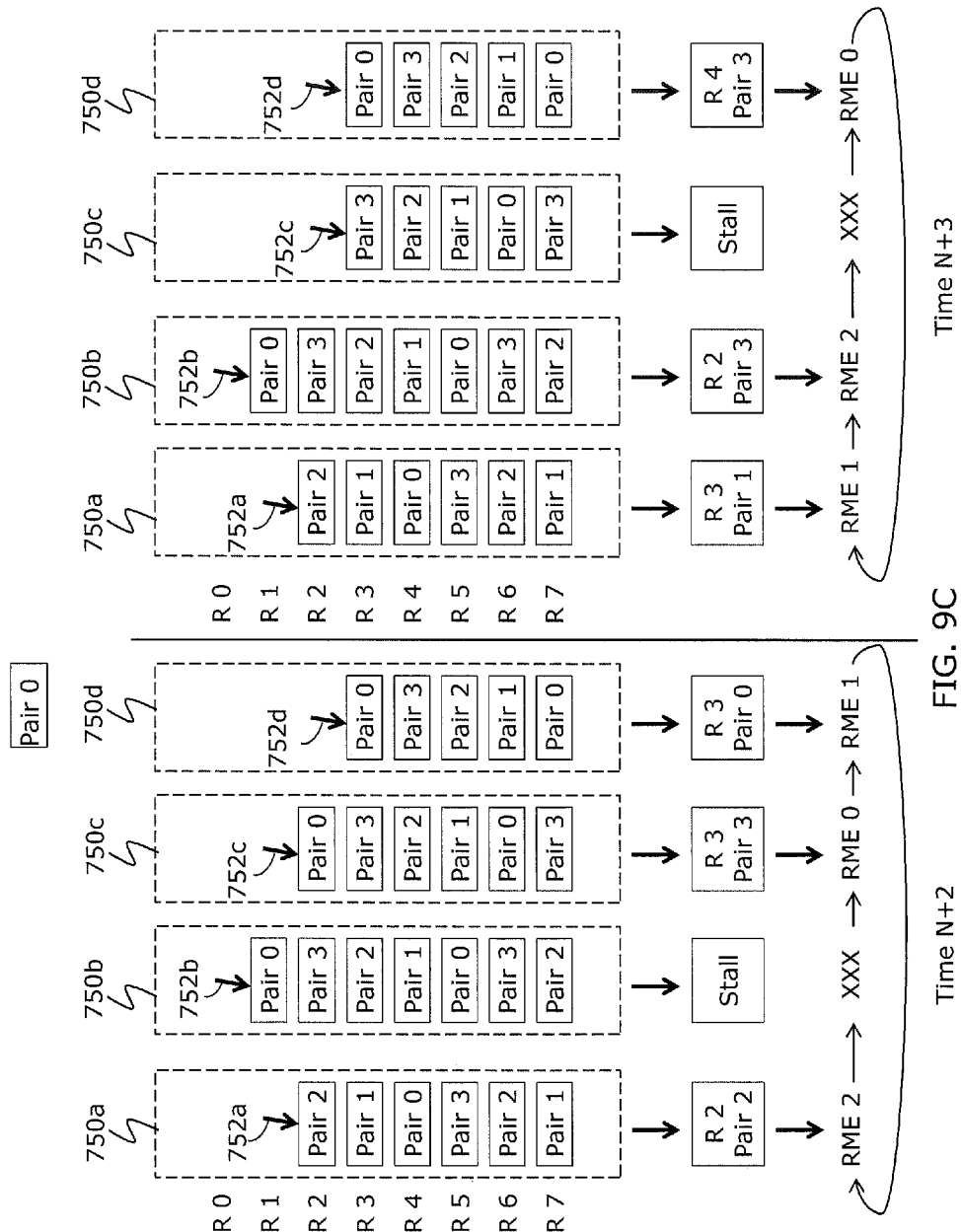

FIGS. 9A-9C are diagrams illustrating the processing of rule matching threads 725 within scheduling queues 750a-d, according to at least one example embodiment. Scheduling queues, e.g., 750a-d, within the scheduler 520 operate independently at each clock cycle. According to at least one implementation scenario, each scheduling queue, e.g., 750a, 750b, 750c, or 750d, is a first in first out (FIFO) buffer. Each scheduling queue, e.g., 750a, 750b, 750c, or 750d, has a scheduler pointer, e.g., 752a, 752b, 752c, or 752d, pointing, for example, to the subgroup corresponding to the bundle with highest bundle priority among the subgroups in the same scheduling queue. Within the subgroup corresponding to the bundle with highest bundle priority, the scheduler pointer, e.g., 752a, 752b, 752c, or 752d, is pointing to the rule matching thread with highest priority among the rule matching threads in the same subgroup. According to at least one example scenario, each RME 518 is configured to receive one rule matching thread 725 at a time. Also, each rule matching thread 725 is forwarded toward a single RME 518. Accordingly, the scheduler 520 forwards one rule matching thread 725 at a time toward a particular RME 514.

In FIG. 9A, the search or memory cluster 320 has four RMEs, e.g., RME 0, RME 1, RME 2, and RME 3, and the scheduler 520 has four scheduling queues 750a-d. At the clock cycle N, the scheduling queues 750a, 750b, 750c, and 750d are forwarding rule matching threads 725, respectively, to the RMEs RME 0, RME 1, RME 2, and RME 3. For example, in the scheduling queue 750a, a rule matching thread 725 from the subgroup "Pair 3" associated with the requestor R1 is forwarded toward RME 0. In the scheduling queue 750b, a rule matching thread 725 from the subgroup "Pair 1" associated with the requestor R0 is forwarded toward RME 1. In the scheduling queue 750c, a rule matching thread 725 from the subgroup "Pair 1" associated with the requestor R1 is forwarded toward RME 2, and in the scheduling queue 750d, a rule matching thread 725 from the subgroup "Pair 1" associated with the requestor R2 is forwarded toward RME 3. It is assumed that each of the subgroups "Pair 3," "Pair 1," "Pair 1," and "Pair 1" corresponding, respectively, to the requestors R1, R0, R1, and R2 has a single rule matching thread 725 not processed yet, at the clock cycle N. At the clock cycle N+1, the RMEs assigned to the scheduling queues 750a-d are rotated. That is, the scheduling queues 750a, 750b, 750c, and 750d are now forwarding rule matching threads 725, respectively, to RME 3, RME 0, RME 1, and RME 2. At the same clock cycle, a rule matching thread 725 from the subgroup "Pair 2," associated with the requestor R2, is forwarded from the scheduling queue 750a toward RME 3. Also, a rule matching thread 725 from the subgroup "Pair 0," associated with the requestor R1, is forwarded from the scheduling queue 750b toward RME 0.

According to FIGS. 9B and 9C, there are only three RMEs available, e.g., RME 0, RME 1, and RME 2, while the scheduler 520 has four scheduling queues, e.g., 750a-d. At each clock cycle one of the scheduling queues 750a-d is stalled and is not scheduling or forwarding any rule matching thread 725 given that at most a single rule matching thread 725 may be sent toward a given RME 518. It is assumed that each of the subgroups "Pair 3," "Pair 1," "Pair 1," and "Pair 1" corresponding, respectively, to the requestors R1, R0, R1, and R2 has a single rule matching thread 725 not processed yet, at the clock cycle N. At the same clock cycle N, the single rule matching threads 725 in the subgroups "Pair 3," "Pair 1," and "Pair 1" corresponding, respectively, to the requestors R1, R0, and R1 are processed and forwarded toward RME 0, RME 1, and RME 2, respectively. The single rule matching thread 725 in the subgroup "Pair 1" corresponding to the requestor R2 is not processed because the corresponding scheduling queue 750d is in stall state at the clock cycle N.

At the clock cycle N+1 the assignment of RME 0, RME 1, RME 2, and the stall state 910 to the scheduling queues 750a-d is updated. Specifically, at the clock cycle N+1, the scheduling queues 750a, 750b, 750c, and 750d are assigned, respectively, to the stall state 910, RME 0, RME 1, and RME 2. At this stage, each of the subgroups "Pair 2," "Pair 0," and "Pair 0," corresponding, respectively, to the requestors R2, R1, and R2, includes two rule matching threads 725, while the subgroup "Pair 1" corresponding to the requestor R2 includes a single rule matching thread 725. At the same clock cycle N+1, rule matching threads 725 from the subgroups "Pair 0," "Pair 0," and "Pair 1" corresponding, respectively, to the requestors R1, R2, and R2 are scheduled and sent toward RME 0, RME 1, and RME 2, respectively. The scheduling queue 750a is stalled at the clock cycle N+1. As such, no rule matching thread 725 is sent from the subgroup "Pair 2" corresponding to the requestor R2. The assignment pattern mapping RME 0, RME 1, RME 2, and the stall state 910 to the scheduling queues 750a-d is shifted, or rotated, at the clock cycles N+2 and N+3 as shown in FIG. 9C.

By changing the RME 518 to which a scheduling queue, e.g., 750a, 750b, 750c, or 750d, is assigned, for example, at each clock cycle, the scheduler 520 guarantees balanced processing loads across the different RMEs 518 of the search cluster 320. The dynamic assignment of available RMEs 518 to the scheduling queues, e.g., 750a-d, allows each RME 518 to receive rule matching threads 725 from different subgroups, and, thus with different priorities. Also if an RME is disabled, or the number of RMEs 518 is less than the number of scheduling queues, e.g., 750a-d, stalling time is distributed among the different scheduling queues. The software of the network search processor 202 may disable a particular RME 518 at any time instant. In such a case, a static assignment of RMEs 518 to the scheduling queues, e.g., 750a-d, causes the scheduling queue assigned to the disabled RME to be stalled for potentially a long period of time. As such, the scheduler 520 may not receive any more rule matching threads 725 from requestors having threads in the stalled scheduling queue.

A person skilled in the art should appreciate that dynamic assignment of RMEs 518 to rule matching threads 725 in respective scheduling queues, e.g., 750a-d, may be implemented in different ways. For example, the dynamic mapping between the RMEs 518 and the scheduling queues, e.g., 750a-d, may be done according to a random pattern instead of a rotating, or shifting, pattern. Also, the update of the mapping pattern may be performed once every clock cycle or every multiple clock cycles.

Figure 10:
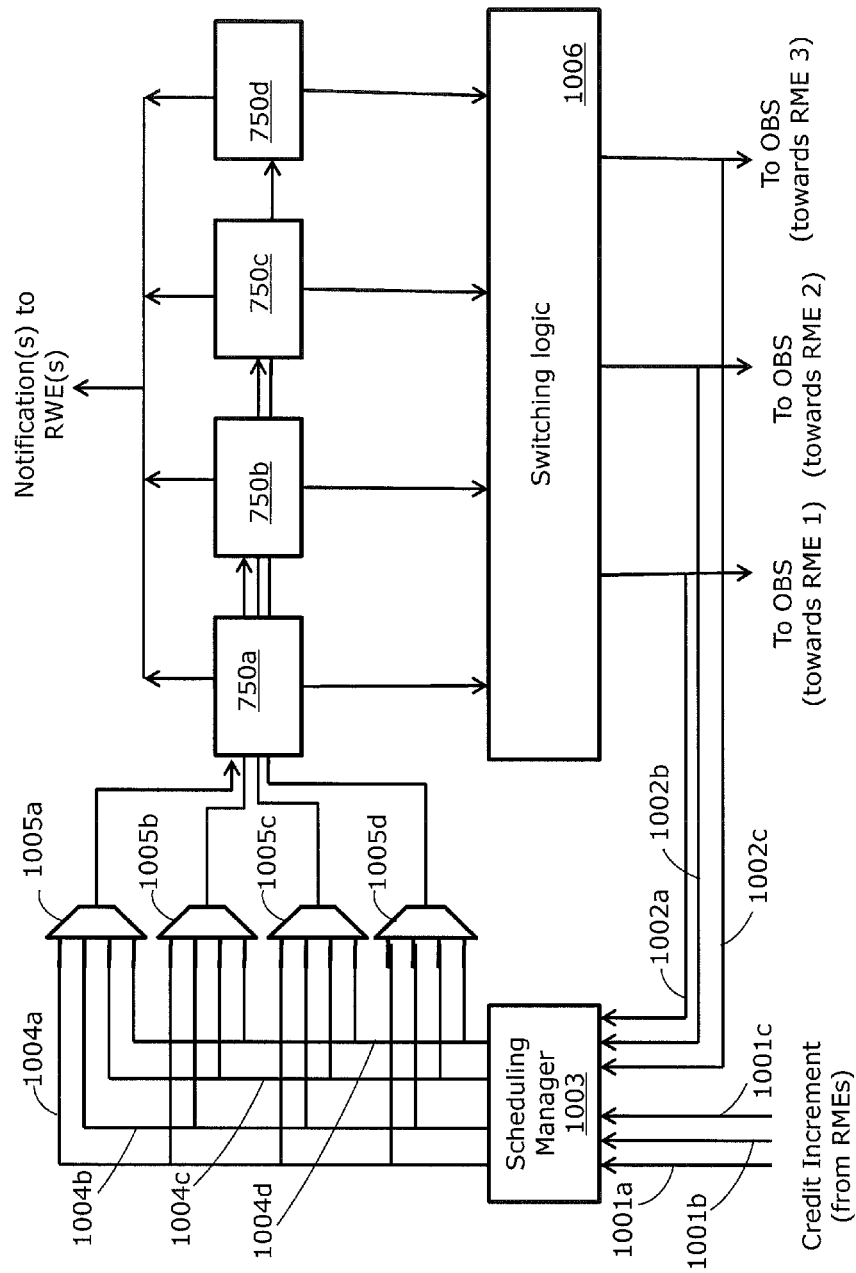
FIG. 10 is a block diagram illustrating an architecture of a scheduler or arbiter module, according to at least one example embodiment.

FIG. 10 is a block diagram illustrating the architecture 1000 of a scheduler or arbiter module 520, according to at least one example embodiment. The schedule 520 includes multiple scheduling queues, e.g., 750a-d. The scheduling queues, e.g., 750a-d, may include memory buffers such as FIFO buffers. The scheduling queues, e.g., 750a-d, are coupled to a switching logic configured to direct rule matching threads 725 from the scheduling queues, e.g., 750a-d, to the RMEs 518. The switching logic may include, for example, multiple multiplexers or selectors. Each selector or multiplexer is configured to select rule matching threads 725 to be directed to specific RME 518.

The scheduler 520 also includes a scheduling manager 1003 configured to control the assignment of the scheduling queues, e.g., 750a-d, to the RMEs 518. The scheduling manager 1003 is configured to keep track of the available memory capacity at each RME 518. Specifically, the scheduling manager 1003 is configured to store the current numbers of available credits at each RME 518, receive credit increment updates, e.g., 1001a-c, in the response 635 from the RMEs 518, receive credit decrement updates, e.g., 1002a-c, related to rule matching threads being sent to the RMEs 518, and adjust the current numbers of available credits based on the received updates, e.g., 1001a-c and 1002a-c. Based on the adjusted current available credits associated with the RMEs 518, the scheduling manager sends indications, e.g., 1004a-d, of available credit counts to the scheduling queues, e.g., 750a-d. Since there are four scheduling queues, e.g., 750a-d, and three RMEs 518, one of the signals 1004a-d is indicative of 0 credits or stall state 910. The multiplexers or selectors 1005a-d are configured to direct credit counts, e.g., 1004a-d to the scheduling queues, e.g., 750a-d. Each credit count, e.g., 1004a, 1004b, 1004c, 1004d, is presented to a single scheduling queue.

The switch logic 1006 directs chosen requests from the four scheduling queues, e.g., 750a-d to the three RMEs 518. Only one scheduling queue can send a rule matching thread 725 to a particular RME 518 at any given time. Per-RME credit counts indicate ability of each RME to receive and process rule matching threads, and also expected processing delay. Fewer credits indicate a higher anticipated processing delay. Rule matching threads 725 sent from scheduling queues, e.g., 750a-d, decrement the per-RME credit counts. The decrement is determined by the size of the rule chunk to be sent to associated RME 518.

Credits are returned from an RME 518, when processing of respective rule matching thread is complete, and credit counts are incremented. Credits may be both incremented and decremented at the same time, causing the net value to be applied to the current credit count. A scheduling queue will not attempt to send a request if the size of the rule chunk 420 to be read exceeds the available credits for the RME 518. The scheduling queue will stall until it is able to send a pending rule matching thread 725. During this time period, the other scheduling queues may send one or more rule matching threads 725. Stalling prevents a rule matching thread 725 with a large rule chunk 420 from being constantly delayed in favor of sending rule matching threads with rule chunks 420 of smaller size. Scheduling queues notify a RWE 516 when a respective rule matching thread 725 is sent towards a RME 518.

The switch logic 1006 is controlled by a control unit. The select lines, in the switch logic 1006, determining the assignment of the RMEs 518 to the scheduling queues, e.g., 750a-d, are altered according to a decision function. For example, scheduling queue to RME pairing is rotated every clock cycle for which the following conditions are satisfied: (1) at least one scheduling queue has a rule matching thread 750 to be forwarded, AND (2) each scheduling queue satisfies at least one of the following: (a) a scheduling queue has no pending rule matching threads 750, OR (b) a scheduling queue has sent at least one request towards its assigned RME 518 since last rotation, OR (c) the RME 518 to which a scheduling queue is assigned has been disabled by software configuration, OR (d) a scheduling queue has not an RME 518 assigned to it.

The control unit controls, for example, both the switching logic and the selectors or multiplexers 1005a-d. The control unit may also perform other functions such as determine expected processing delay for rule matching thread based on expected processing time at a respective RME 518 and traveling and queuing time. Processing time at the RME 518 may be determined based on credits not returned to the scheduler 520 by the RME 518. Traveling and queuing time may be determined based on, for example, all rule matching threads already sent by the scheduler 520 to RMEs 518 and for which no response 635 is received yet.

A person skilled in the art should appreciate that a rule matching thread 725 may be considered to start when the BWE 514 receives the respective bucket entry, when the BWE 514 sends the respective bundle of bucket entries to the RWE 516, when the RWE 516 receives the respective bundle from the BWE 514, or when the RWE 516 sends the respective bundle to the scheduler. Sending a rule chunk request by the scheduler is part of the rule matching thread 725 and may be interpreted as forwarding the rule matching thread toward the scheduler 520.

While this invention has been particularly shown and described with references to example embodiments thereof, it will be understood by those skilled in the art that various changes in form and details may be made therein without departing from the scope of the invention encompassed by the appended claims.

What is claimed is:

1. A method of scheduling rule matching threads initiated by a plurality of initiating engines in a network search processor, for processing by multiple matching engines of the network search processor, the method comprising:
   determining, by a scheduler, a set of bundles of rule matching threads, each bundle being initiated by a separate initiating engine;
   distributing rule matching threads in each bundle of the set of bundles into a number of subgroups of rule matching threads;
   assigning the subgroups of rule matching threads associated with each bundle of the set of bundles to multiple scheduling queues; and
   sending rule matching threads, assigned to each scheduling queue, toward rule matching engines according to an order based on priorities associated with the respective bundles of rule matching threads.

2. A method according to claim 1 further comprising receiving, at the scheduler, data corresponding to one or more bundles of rule matching threads from one or more initiating engines of the plurality of initiating engines.

3. A method according to claim 2, wherein upon receiving data corresponding to a first bundle from a given initiating engine, no other data corresponding to at least one other bundle is received from the given initiating engine until sending all rule matching threads in the first bundle to rule matching engines.

4. A method according to claim 1 further comprising sending a notification to an initiating engine associated with a given bundle upon sending at least one rule matching thread associated with the given bundle.

5. A method according to claim 1, wherein the set of bundles determined being the bundles of the rule matching threads available at the scheduler at the time the set of bundles is determined.

6. A method according to claim 1, wherein sending the rule matching threads toward the rule matching engines includes sending a request, for a respective data chunk, to a memory component of the network search processor, the respective data chunk being retrieved and forwarded to the rule matching engine.

7. A method according to claim 1, wherein the set of bundles is a first set of bundles and the method further comprising determining a second set of bundles upon sending all the rule matching threads in the first set of bundles toward the rule matching engines.

8. A method according to claim 1, wherein within a subgroup, the order is further based on priorities assigned to rule matching threads of a respective bundle.

9. A method according to claim 1, wherein sending a rule matching thread toward a rule matching engine includes sending the rule matching thread only if a respective expected processing delay does not exceed a pre-defined threshold.

10. A method according to claim 9, wherein the expected processing delay includes a processing time, at the rule matching engine, of the rule matching thread and an expected traveling and queuing time of the rule matching thread, the processing time is dependent on a size of a data chunk associated with the respective rule matching thread, the travel and queuing time being dependent on a cumulative size of data chunks associated with rule matching threads sent to the rule matching engines.

11. A network search processor comprising:
    a plurality of initiating engines configured to initiate bundles of rule matching threads;
    multiple rule matching engines configured to process the rule matching threads;
    a scheduling engine configured to:
        determine a set of bundles of rule matching threads, each bundle being initiated by a separate initiating engine;
        distribute rule matching threads in each bundle of the set of bundles into a number subgroups of rule matching threads;
        assign the subgroups of rule matching threads associated with each bundle to multiple scheduling queues; and
        send rule matching threads, assigned to each scheduling queue, toward rule matching engines according to an order based on priorities associated with the respective bundles of rule matching threads.

12. A network search processor according to claim 11, wherein the scheduling engine is configured to further receive data corresponding to one or more bundles of rule matching threads from one or more initiating engines of the plurality of initiating engines.

13. A network search processor according to claim 12, wherein upon receiving data corresponding to a first bundle from a given initiating engine, no other data corresponding to at least one other bundle is received from the given initiating engine until sending all rule matching threads in the first bundle to rule matching engines.

14. A network search processor according to claim 11, wherein the scheduling engine is configured to send a notification to an initiating engine associated with a given bundle upon sending at least one rule matching thread associated with the given bundle.

15. A network search processor according to claim 11, wherein the set of bundles determined being the bundles of the rule matching threads available at the scheduling engine at the time the set of bundles is determined.

16. A network search processor according to claim 11, wherein in sending a rule matching thread toward a rule matching engine, the scheduling engine is configured to send a request for a respective data chunk to a memory component of the network search processor, the respective data chunk being retrieved and forwarded to the rule matching engine.

17. A network search processor according to claim 11, wherein the set of bundles is a first set of bundles and the scheduling engine is configured to further determine a second set of bundles upon sending all the rule matching threads in the first set of bundles toward the rule matching engines.

18. A network search processor according to claim 11, wherein within a subgroup, the order is further based on priorities assigned to rule matching threads of a respective bundle.

19. A network search processor according to claim 11, wherein in sending a rule matching thread toward a rule matching engine the scheduling engine is configured to send the rule matching thread only if a respective expected processing delay does not exceed a pre-defined threshold.

20. A network search processor according to claim 19, wherein the expected processing delay is a sum of a processing time of the rule matching thread and an expected traveling and queuing time of the rule matching thread, the processing time is dependent on a size of a data chunk associated with the respective rule matching thread, the travel and queuing time being dependent on a cumulative size of data chunks associated with rule matching threads sent to the rule matching engines.

* * * * *